United States Patent
Khoshnevisan et al.

(10) Patent No.: US 12,309,796 B2
(45) Date of Patent: May 20, 2025

(54) APPLYING UNIFIED TRANSMISSION CONFIGURATION INDICATION STATES TO SIGNALS OR CHANNELS ASSOCIATED WITH CONTROL RESOURCE SET POOL INDEX VALUES

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 17/648,867

(22) Filed: Jan. 25, 2022

(65) Prior Publication Data
US 2023/0239885 A1 Jul. 27, 2023

(51) Int. Cl.
*H04W 72/23* (2023.01)

(52) U.S. Cl.
CPC .................... *H04W 72/23* (2023.01)

(58) Field of Classification Search
CPC .... H04W 72/23; H04B 7/0696; H04L 5/0094; H04L 5/0023; H04L 5/0044
See application file for complete search history.

(56) References Cited

U.S. PATENT DOCUMENTS

| | | | | |
|---|---|---|---|---|
| 2022/0225286 | A1* | 7/2022 | Cirik | H04W 72/046 |
| 2022/0417909 | A1* | 12/2022 | Zhu | H04L 5/0023 |
| 2023/0180331 | A1* | 6/2023 | Zhu | H04W 76/19 370/252 |
| 2023/0199795 | A1* | 6/2023 | Zhu | H04W 72/231 370/329 |
| 2024/0072869 | A1* | 2/2024 | Zhang | H04L 5/0035 |

FOREIGN PATENT DOCUMENTS

WO  WO-2021212456 A1   10/2021

OTHER PUBLICATIONS

3GPP TSG RAN WG1 #107-e Enhancements on Multi-TRP for PDCCH, PUSCH and PUCCH, Xiaomi, Nov. 11-19, 2021 (Year: 2021).*

(Continued)

*Primary Examiner* — Mohamed A Kamara
*Assistant Examiner* — Rachel Elizabeth Marks
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, one or more medium access channel control elements (MAC-CEs) that indicate a plurality of transmission configuration indication (TCI) field codepoints, wherein each TCI field codepoint corresponds to one or more of: one or more unified TCI states or one or more control resource set (CORESET) pool index values. The UE may receive, from the base station, one or more downlink control informations (DCIs) that indicate one or more TCI field codepoints indicated by the one or more MAC-CEs. Numerous other aspects are described.

30 Claims, 13 Drawing Sheets

(56) References Cited

OTHER PUBLICATIONS

CATT: "Discussion on the Unified TCI Framework", 3GPP TSG-RAN WG2 Meeting #116bis electronic, R2-2201253, 3rd Generation Partnership Project, Mobile Competence Centre, 650, Route Des Lucioles, F-06921 Sophia-Antipolis Cedex, France, vol. RAN WG2, No. electronic, Jan. 17, 2022-Jan. 25, 2022, Jan. 11, 2022, 4 Pages, XP052094354, The whole document.
International Search Report and Written Opinion—PCT/US2023/061025—ISA/EPO—May 15, 2023.
Samsung: "Further Enhancements on MIMO for NR", 3GPP TSG RAN Meeting #94-e, RP-213478, 3rd Generation Partnership Project, Mobile Competence Centre, 650, Route Des Lucioles, F-06921 Sophia-Antipolis Cedex, France, vol. TSG RAN, No. Electronic Meeting, Dec. 6, 2021-Dec. 17, 2021, Dec. 3, 2021, 28 Pages, XP052086915, The whole document.
Xiaomi: "Enhancements on Multi-TRP for PDCCH, PUSCH and PUCCH", 3GPP TSG RAN WG1 #107-e, R1-2111541, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 6, 2021, XP052074955, Section 2.1.
ZTE: "Further Details on Multi-Beam and Multi-TRP Operation", 3GPP TSG RAN WG1 Meeting #107-e, R1-2110955, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 6, 2021, 16 Pages, XP052074688, Section 2.2, The whole document.

\* cited by examiner

FIG. 4

| | Oct 1 | Oct 2 | Oct 3 | | Oct N |
|---|---|---|---|---|---|
| | BWP ID | $T_0$ | $T_8$ | | $T_{(N-2) \times 8}$ |
| | | $T_1$ | $T_9$ | | $T_{(N-2) \times 8+1}$ |
| | Serving Cell ID | $T_2$ | $T_{10}$ | | $T_{(N-2) \times 8+2}$ |
| | | $T_3$ | $T_{11}$ | | $T_{(N-2) \times 8+3}$ |
| | | $T_4$ | $T_{12}$ | | $T_{(N-2) \times 8+4}$ |
| | | $T_5$ | $T_{13}$ | | $T_{(N-2) \times 8+5}$ |
| | | $T_6$ | $T_{14}$ | | $T_{(N-2) \times 8+6}$ |
| | CORESET Pool ID | $T_7$ | $T_{15}$ | | $T_{(N-2) \times 8+7}$ |

400

- DL TCI state 1 is applied to DL signals/channels associated with CORESETPoolInex value 0
- UL TCI state 3 is applied to UL signals/channels associated with CORESETPoolIndex value 0
- UL TCI state 2 is applied to UL signals/channels associated with CORESETPoolIndex value 1

DCI format 1_1/1_2 with beam indication (w/ or w/o PDSCH scheduling) in a CORESET with CORESETPoolIndex 0

PUCCH with HARQ-Ack

Y symbols

TCI field codepoint

PUCCH with HARQ-Ack

3ms

MAC-CE (or PDSCH)

| TCI codepoints | TCI states |
|---|---|
| 0 | DL TCI state 5 for CORESETPoolIndex=0 |
| 1 | DL TCI state 1 and UL TCI state 3 for CORESETPoolIndex=0<br>UL TCI state 2 for CORESETPoolIndex=1 |
| 2 | UL TCI state 4 for both CORESETPoolIndex=0 and 1 |
| ... | ... |
| 7 | DL TCI state 2 and UL TCI state 5 for CORESETPoolIndex=0<br>DL TCI state 3 and UL TCI state 2 for CORESETPoolIndex=1 |

APPLYING UNIFIED TRANSMISSION CONFIGURATION INDICATION STATES TO SIGNALS OR CHANNELS ASSOCIATED WITH CONTROL RESOURCE SET POOL INDEX VALUES

FIELD OF THE DISCLOSURE

Aspects of the present disclosure generally relate to wireless communication and to techniques and apparatuses for applying unified transmission configuration indication (TCI) states to signals or channels associated with control resource set (CORESET) pool index values.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, a method of wireless communication performed by a user equipment (UE) includes receiving, from a base station, one or more medium access channel control elements (MAC-CEs) that indicate a plurality of transmission configuration indication (TCI) field codepoints, wherein each TCI field codepoint corresponds to one or more of: one or more unified TCI states or one or more control resource set (CORESET) pool index values; receiving, from the base station, one or more downlink control informations (DCIs) that indicate one or more TCI field codepoints indicated by the one or more MAC-CEs; applying first unified TCI states, of the one or more unified TCI states, associated with the one or more TCI field codepoints to a signal or a channel associated with a first CORESET pool index value of the one or more CORESET pool index values; and applying second unified TCI states, of the one or more unified TCI states, associated with the one or more TCI field codepoints to a signal or a channel associated with a second CORESET pool index value of the one or more CORESET pool index values.

In some implementations, a method of wireless communication performed by a base station includes transmitting, to a UE, one or more MAC-CEs that indicate a plurality of TCI field codepoints, wherein each TCI field codepoint corresponds to one or more of: one or more unified TCI states or one or more CORESET pool index values; and transmitting, to the UE, one or more DCIs that indicate one or more TCI field codepoints indicated by the one or more MAC-CEs.

In some implementations, an apparatus for wireless communication at a UE includes a memory and one or more processors, coupled to the memory, configured to: receive, from a base station, one or more MAC-CEs that indicate a plurality of TCI field codepoints, wherein each TCI field codepoint corresponds to one or more of: one or more unified TCI states or one or more CORESET pool index values; receive, from the base station, one or more DCIs that indicate one or more TCI field codepoints indicated by the one or more MAC-CEs; apply first unified TCI states, of the one or more unified TCI states, associated with the one or more TCI field codepoints to a signal or a channel associated with a first CORESET pool index value of the one or more CORESET pool index values; and apply second unified TCI states, of the one or more unified TCI states, associated with the one or more TCI field codepoints to a signal or a channel associated with a second CORESET pool index value of the one or more CORESET pool index values.

In some implementations, an apparatus for wireless communication at a base station includes a memory and one or more processors, coupled to the memory, configured to: transmit, to a UE, one or more MAC-CEs that indicate a plurality of TCI field codepoints, wherein each TCI field codepoint corresponds to one or more of: one or more unified TCI states or one or more CORESET pool index values; and transmit, to the UE, one or more DCIs that indicate one or more TCI field codepoints indicated by the one or more MAC-CEs.

In some implementations, a non-transitory computer-readable medium storing a set of instructions for wireless communication includes one or more instructions that, when executed by one or more processors of a UE, cause the UE to: receive, from a base station, one or more MAC-CEs that indicate a plurality of TCI field codepoints, wherein each TCI field codepoint corresponds to one or more of: one or more unified TCI states or one or more CORESET pool index values; receive, from the base station, one or more DCIs that indicate one or more TCI field codepoints indicated by the one or more MAC-CEs; apply first unified TCI states, of the one or more unified TCI states, associated with the one or more TCI field codepoints to a signal or a channel associated with a first CORESET pool index value of the one or more CORESET pool index values; and apply second unified TCI states, of the one or more unified TCI states, associated with the one or more TCI field codepoints to a signal or a channel associated with a second CORESET pool index value of the one or more CORESET pool index values.

In some implementations, a non-transitory computer-readable medium storing a set of instructions for wireless communication includes one or more instructions that, when executed by one or more processors of a base station, cause the base station to: transmit, to a UE, one or more MAC-CEs that indicate a plurality of TCI field codepoints, wherein each TCI field codepoint corresponds to one or more of: one or more unified TCI states or one or more CORESET pool index values; and transmit, to the UE, one or more DCIs that indicate one or more TCI field codepoints indicated by the one or more MAC-CEs.

In some implementations, an apparatus for wireless communication includes means for receiving, from a base station, one or more MAC-CEs that indicate a plurality of TCI field codepoints, wherein each TCI field codepoint corresponds to one or more of: one or more unified TCI states or one or more CORESET pool index values; means for receiving, from the base station, one or more DCIs that indicate one or more TCI field codepoints indicated by the one or more MAC-CEs; means for applying first unified TCI states, of the one or more unified TCI states, associated with the one or more TCI field codepoints to a signal or a channel associated with a first CORESET pool index value of the one or more CORESET pool index values; and means for applying second unified TCI states, of the one or more unified TCI states, associated with the one or more TCI field codepoints to a signal or a channel associated with a second CORESET pool index value of the one or more CORESET pool index values.

In some implementations, an apparatus for wireless communication includes means for transmitting, to a UE, one or more MAC-CEs that indicate a plurality of TCI field codepoints, wherein each TCI field codepoint corresponds to one or more of: one or more unified TCI states or one or more CORESET pool index values; and means for transmitting, to the UE, one or more DCIs that indicate one or more TCI field codepoints indicated by the one or more MAC-CEs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of transmission configuration indication (TCI) states activation or deactivation, in accordance with the present disclosure.

FIGS. 6-9 are diagrams illustrating examples associated with applying unified TCI states to signals or channels associated with control resource set (CORESET) pool index values, in accordance with the present disclosure.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
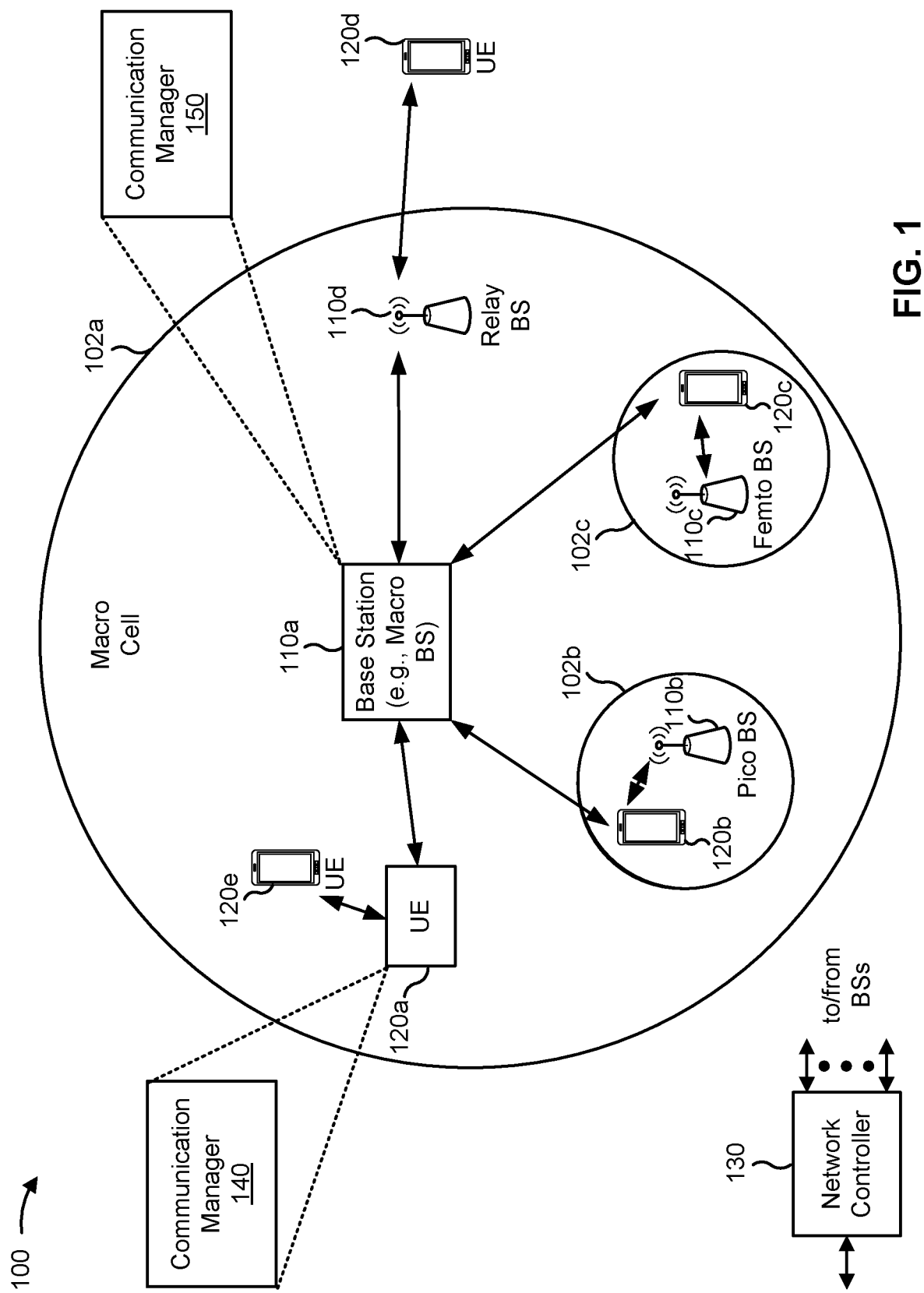
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a base station, one or more medium access channel control elements (MAC-CEs) that indicate a plurality of transmission configuration indication (TCI) field codepoints, wherein each TCI field codepoint corresponds to one or more of: one or more unified TCI states or one or more control resource set (CORESET) pool index values; receive, from the base station, one or more downlink control informations (DCIs) that indicate one or more TCI field codepoints indicated by the one or more MAC-CEs; apply first unified TCI states, of the one or more unified TCI states, associated with the one or more TCI field codepoints to a signal or a channel associated with a first CORESET pool index value of the one or more CORESET pool index values; and apply second unified TCI states, of the one or more unified TCI states, associated with the one or more TCI field codepoints to a signal or a channel associated with a second CORESET pool index value of the one or more CORESET pool index values. Additionally, or alternatively, the communication manager 140 may perform one or more other operations described herein.

In some aspects, a base station (e.g., base station 110) may include a communication manager 150. As described in more detail elsewhere herein, the communication manager 150 may transmit, to a UE, one or more MAC-CEs that indicate a plurality of TCI field codepoints, wherein each TCI field codepoint corresponds to one or more of: one or more unified TCI states or one or more CORESET pool index values; and transmit, to the UE, one or more DCIs that indicate one or more TCI field codepoints indicated by the one or more MAC-CEs. Additionally, or alternatively, the communication manager 150 may perform one or more other operations described herein.

As indicated above, FIG. 1 is provided as an example. Other examples may differ from what is described with regard to FIG. 1.

Figure 2:
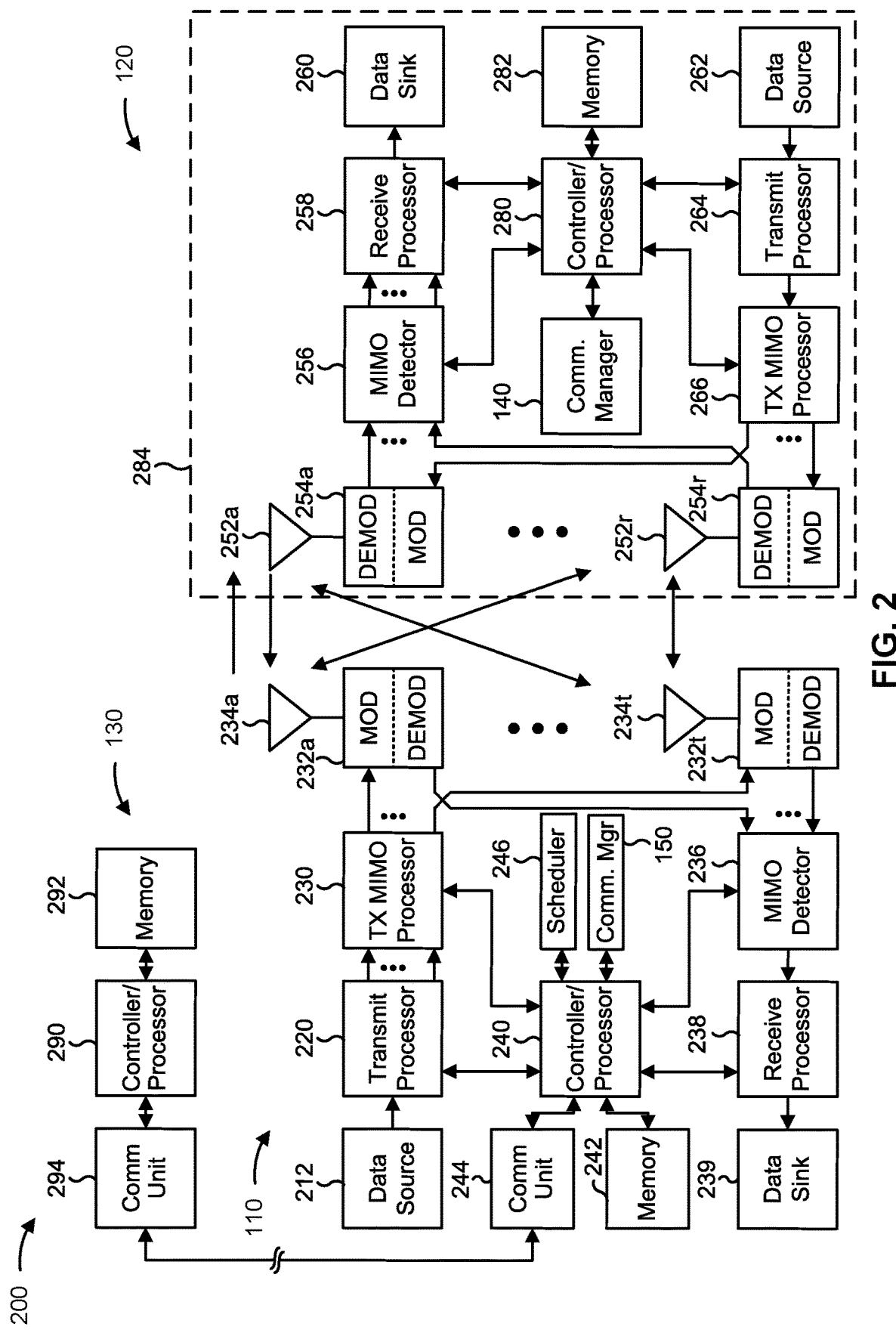
FIG. 2 is a diagram illustrating an example of a base station in communication with a user equipment in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-13).

The controller/processor 240 of the base station 110, the controller/processor 280 of the UE 120, and/or any other component(s) of FIG. 2 may perform one or more techniques associated with applying unified TCI states to signals or channels associated with CORESET pool index values, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a base station, one or more MAC-CEs that indicate a plurality of TCI field codepoints, wherein each TCI field codepoint corresponds to one or more of: one or more unified TCI states or one or more CORESET pool index values; means for receiving, from the base station, one or more DCIs that indicate one or more TCI field codepoints indicated by the one or more MAC-CEs; means for applying first unified TCI states, of the one or more unified TCI states, associated with the one or more TCI field codepoints to a signal or a channel associated with a first CORESET pool index value of the one or more CORESET pool index values; and/or means for applying second unified TCI states, of the one or more unified TCI states, associated with the one or more TCI field codepoints to a signal or a channel associated with a second CORESET pool index value of the one or more CORESET pool index values. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., base station 110) includes means for transmitting, to a UE, one or more MAC-CEs that indicate a plurality of TCI field codepoints, wherein each TCI field codepoint corresponds to one or more of: one or more unified TCI states or one or more CORESET pool index values; and/or means for transmitting, to the UE, one or more DCIs that indicate one or more TCI field codepoints indicated by the one or more MAC-CEs. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
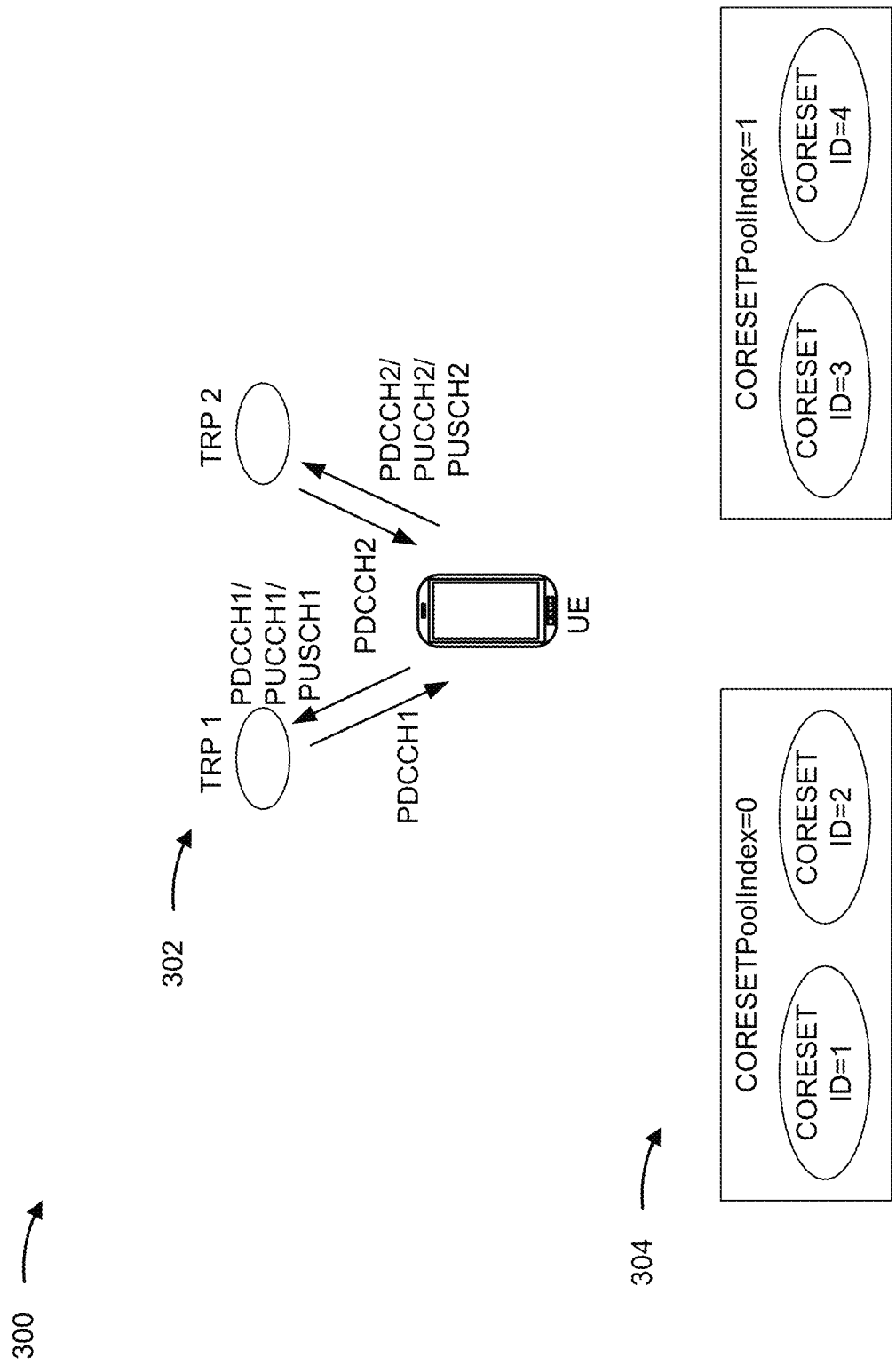
FIG. 3 is a diagram illustrating an example of multiple downlink control information based multiple transmission reception point transmissions, in accordance with the present disclosure.

FIG. 3 is a diagram illustrating an example 300 of multiple downlink control information (multi-DCI) based multiple TRP (mTRP) transmissions, in accordance with the present disclosure.

As shown by reference number 302, for multi-DCI-based mTRP transmissions, a first TRP may transmit a first DCI via a first physical downlink control channel (PDCCH). The first DCI may schedule a first physical downlink shared channel (PDSCH), a first physical uplink control channel (PUCCH), and/or a first physical uplink shared channel (PUSCH), which may be transmitted from or to the first TRP. A second TRP may transmit a second DCI via a second PDCCH. The second DCI may schedule a second PDSCH, a second PUCCH, and/or a second PUSCH, which may be transmitted from or to the second TRP.

A TRP differentiation at a UE may be based at least in part on a CORESET pool index (CORESETPoolIndex). Each CORESET (e.g., with a maximum of 5 CORESETs) may be configured with a CORESETPoolIndex value. The CORESETPoolIndex value may be 0 or 1, which may group CORESETs into two groups. Other than the CORESETPoolIndex value, different TRPs may be transparent to the UE. The UE may be configured with multi-DCI-based mTRP when the UE is configured by a higher layer parameter PDCCH-Config that contains two different values of CORESETPoolIndex in CORESETs for an active bandwidth part (BWP) of a serving cell. Further, an mTRP operation may be defined in a given component carrier (CC) by configuring two CORESETPoolIndex values in different CORESETs in the active BWP of that CC. When a CORESET is not configured with a CORESETPoolIndex value, a CORESETPoolIndex value of zero may be assumed.

As shown by reference number 304, a first CORESETPoolIndex (e.g., CORESETPoolIndex=0) may be associated with a first CORESET identifier (ID) (e.g., CORESET ID=1) and a second CORESET ID (e.g., CORESET ID=2). A second CORESETPoolIndex (e.g., CORESETPoolIndex=1) may be associated with a third CORESET ID (e.g., CORESET ID=3) and a fourth CORESET ID (e.g., CORESET ID=4).

As indicated above, FIG. 3 is provided as an example. Other examples may differ from what is described with regard to FIG. 3.

A scheduling DCI may dynamically schedule channels and/or signals, which may be associated with a CORESETPoolIndex value based at least in part on a CORESET configuration of the scheduling DCI. The channels and/or signals may include a PDSCH scheduled by a DCI (e.g., DCI formats 1_0, 1_1, 1_2), a hybrid automatic repeat request acknowledgement (HARQ-ACK) transmitted on a PUCCH for a PDSCH that is scheduled by a DCI (e.g., DCI formats 1_0, 1_1, 1_2), and/or a PUSCH scheduled by a DCI (e.g., DCI formats 0_0, 0_1, 0_2). Other channels and/or signals which may not be associated with a CORESETPoolIndex value may include a semi-persistent scheduling (SPS) PDSCH, a HARQ-ACK transmitted on a PUCCH for an SPS PDSCH, a channel state information (CSI) report transmitted on a PUCCH for an SPS PDSCH, a scheduling request (SR) transmission on a PUCCH, and/or a configured grant PUSCH (CG-PUSCH) associated with a Type 1 or a Type 2.

For a beam indication, a transmission configuration indicator (TCI) state may be defined for downlink signals/channels. A radio resource control (RRC) configuration may configure up to 128 TCI states. For a PDCCH, one TCI state may be activated by a medium access control control element (MAC-CE) per CORESET. For a channel state information reference signal (CSI-RS), a TCI state may be configured via RRC signaling (e.g., for a periodic CSI-RS or an aperiodic CSI-RS) or may be indicated by a MAC-CE (e.g., for a semi-persistent CSI-RS (SP-CSI-RS))

For a PDSCH, up to 8 TCI states may be activated by a MAC-CE and mapped to 8 TCI codepoints in DCI (DCI formats 1_1/1_2). DCI may indicate one of the activated TCI states via a TCI field, where an indication by the DCI may be for a scheduled PDSCH and may not be applicable to other PDSCHs. When two CORESETPoolIndex values are configured for a CC, separate MAC-CEs may activate up to 8 TCI states per CORESETPoolIndex. A TCI field of a DCI format 1_1/1_2 may be interpreted differently (based at least in part on a corresponding MAC-CE) depending on whether the TCI field is received on a CORESET with a CORESETPoolIndex value of 0 or 1.

For an uplink, spatial relation information may be used for a definition of an uplink beam, where the spatial relation information may be used instead of a TCI state. For a PUCCH, one spatial relation information may be activated by a MAC-CE per PUCCH resource. For a PUSCH, a sounding reference signal (SRS) resource indicator (SRI) field in a scheduling DCI may point to one or more SRS resources (e.g., within a configured SRS resource set for a codebook- or non-codebook-based uplink), and spatial relation information associated with the indicated SRS resource(s) may be used for the scheduled PUSCH. For an SRS, spatial relation information may be configured via RRC signaling (e.g., for a periodic SRS) or may be indicated by a MAC-CE (e.g., for a semi-persistent SRS or an aperiodic SRS) per SRS resource.

FIG. 4 is a diagram illustrating an example 400 of a TCI states activation or deactivation, in accordance with the present disclosure.

As shown in FIG. 4, a TCI states activation/deactivation may be defined for a UE-specific PDSCH MAC-CE. The UE-specific PDSCH MAC-CE may activate up to 8 TCI states, which may be mapped to 8 TCI codepoints. The UE-specific PDSCH MAC-CE may be associated with a CORESETPoolIndex, a serving cell ID, and a BWP ID.

As indicated above, FIG. 4 is provided as an example. Other examples may differ from what is described with regard to FIG. 4.

With a unified DCI, downlink TCI states, uplink TCI states, or joint downlink/uplink TCI states may be RRC-configured. A MAC-CE may activate a quantity of RRC-configured TCI states, and may map to TCI field codepoints with various possibilities. One TCI field codepoint may represent a joint downlink/uplink TCI state mapped to one TCI codepoint, which may be used for a joint downlink/uplink beam indication. One TCI field codepoint may represent a pair of downlink TCI state and uplink TCI state, which may be used for separate downlink/uplink beam indication. One TCI field codepoint may represent only a downlink TCI state, which may be used for only downlink beam indication. One TCI field codepoint may represent only an uplink TCI state, which may be used for only uplink beam indication.

When a MAC-CE indicates a mapping to only a single TCI field codepoint, the single TCI field codepoint may serve as a beam indication. The beam indication may be applied, for example, 3 ms after a HARQ-ACK to a PDSCH carrying the MAC-CE. When a MAC-CE indicates a mapping to more than one TCI field codepoint, downlink DCI (e.g., DCI format 1_1/1_2) with or without a downlink assignment may indicate a beam through a TCI field codepoint. In this case, a beam indication may be applied in a first slot that is at least Y symbols (e.g., which may be RRC-configured based at least in part on a UE capability) after a last symbol of a PUCCH carrying a HARQ-ACK in response to the downlink DCI.

With the unified TCI, a beam indication may be "sticky", such that the beam indication is not related to a scheduled PDSCH and may not be a one-time indication. When the beam indication is applied, the beam indication may remain the same for applicable channels/signals until another DCI format 1_1/1_2 changes the beam. The beam indication may be for uplink or for both downlink and uplink, even though the beam indication may be transmitted in DCI formats 1_1/1_2. The beam indication may be common for multiple downlink channels/signals (e.g., PDSCH, PDCCH, and/or CSI-RS) and/or multiple uplink channels/signals (e.g., PUSCH, PUCCH, and/or SRS). Further, the beam indication may be defined for a single TRP (sTRP).

Figure 5:
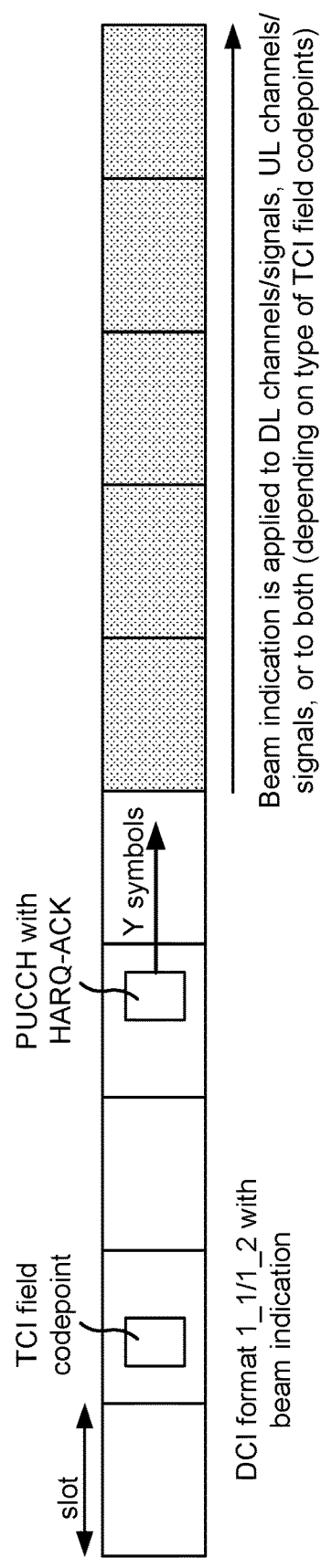
FIG. 5 is a diagram illustrating an example of a unified TCI, in accordance with the present disclosure.

FIG. 5 is a diagram illustrating an example 500 of a unified TCI, in accordance with the present disclosure.

As shown in FIG. 5, a base station may transmit a DCI (e.g., a DCI format 1_1/1_2) with a beam indication to a UE. The base station may transmit the DCI with or without a PDSCH scheduling. The base station may provide the beam indication using a TCI field codepoint. The base station may receive, from the UE and based at least in part on the DCI transmission, a PUCCH with a HARQ-ACK. At Y symbols after the HARQ-ACK transmission, the beam indication may be applied to downlink channels/signals, uplink channels/signals, or to both downlink/uplink channels/signals, depending on a type associated with the TCI field codepoint.

As indicated above, FIG. 5 is provided as an example. Other examples may differ from what is described with regard to FIG. 5.

A UE may support a unified TCI in a multi-DCI-based mTRP. However, the UE may not be configured to handle a unified TCI for the multi-DCI-based mTRP when two different values of CORESET pool index values in CORESETs are configured for a CC.

In various aspects of techniques and apparatuses described herein, a UE may receive, from a base station, one or more MAC-CEs that indicate a plurality of TCI field codepoints. Each TCI field codepoint may correspond to one or more unified TCI states and/or one or more CORESET pool index values. The UE may receive, from the base station, one or more DCIs that indicate one or more TCI field codepoints indicated by the one or more MAC-CEs. The UE may apply first unified TCI states, of the one or more unified TCI states, associated with the one or more TCI field codepoints to a signal or a channel associated with a first CORESET pool index value of the one or more CORESET pool index values. The UE may apply second unified TCI states, of the one or more unified TCI states, associated with the one or more TCI field codepoints to a signal or a channel associated with a second CORESET pool index value of the one or more CORESET pool index values.

In some aspects, the unified TCI may be extended to the multi-DCI-based mTRP. The unified TCI, which may include a DCI-based beam indication for multiple downlink/uplink signals/channels, may be extended to the case of multi-DCI-based mTRP when two different values of a CORESETPoolIndex in CORESETs are configured for a CC or for an active BWP of the CC. Further, different options for MAC-CE TCI state activation and DCI-based TCI state indication may be defined herein, as well as mechanisms for applying a beam indication to different DL/UL channels/signals. Further, mechanisms for determining an association of different downlink/uplink channels/signals with one CORESETPoolIndex value may be defined herein.

Figure 6:
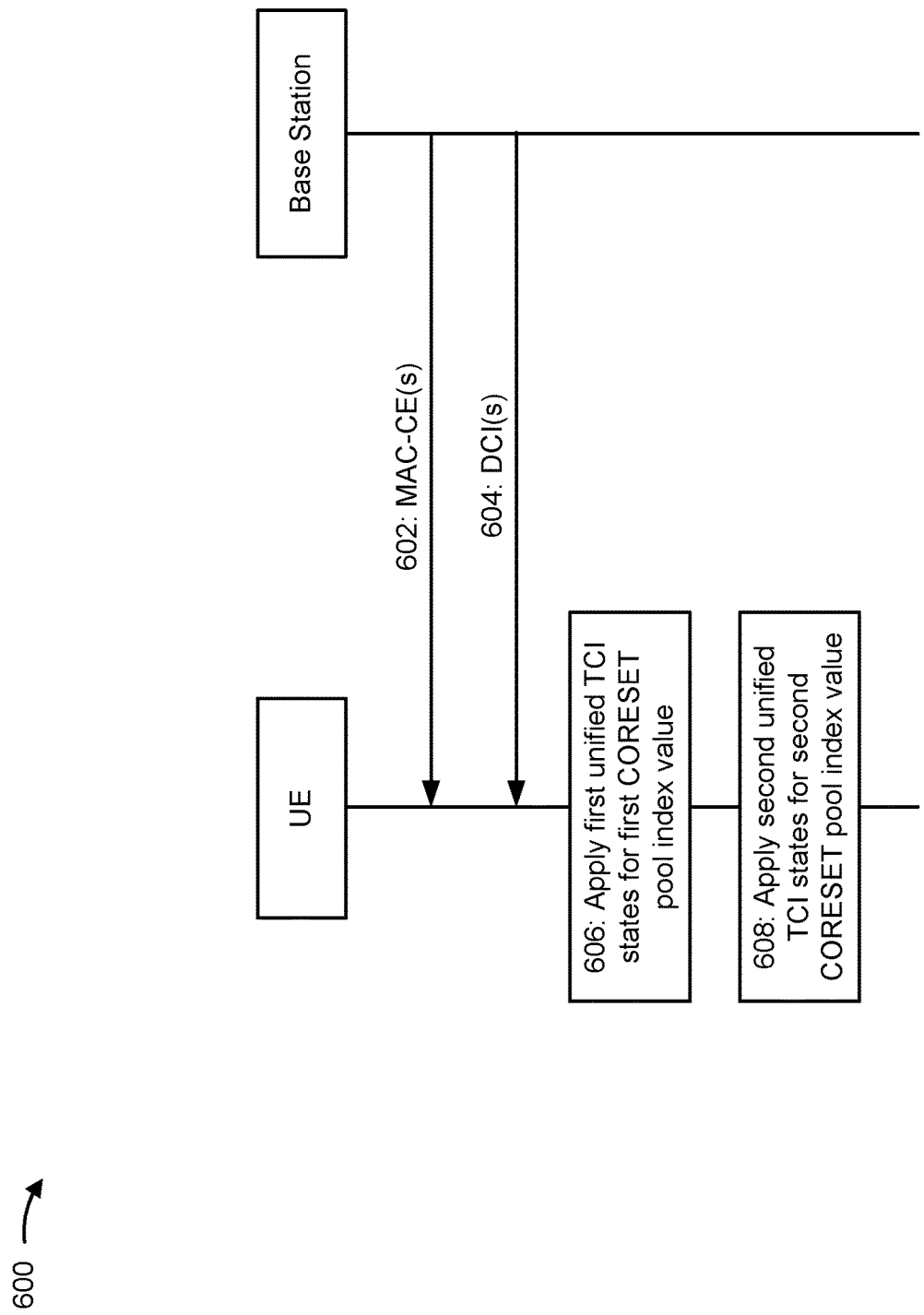

FIG. 6 is a diagram illustrating an example 600 associated with applying unified TCI states to signals or channels associated with CORESET pool index values, in accordance with the present disclosure. As shown in FIG. 6, example 600 includes communication between a UE (e.g., UE 120) and a base station (e.g., base station 110). In some aspects, the UE and the base station may be included in a wireless network, such as wireless network 100.

As shown by reference number 602, the UE may receive (e.g., using antenna 252, modem 254, MIMO detector 256, receive processor 258, controller/processor 280, and/or memory 282), from a base station, one or more MAC-CEs that indicate a plurality of TCI field codepoints. Each TCI field codepoint may correspond to one or more unified TCI states and/or one or more CORESET pool index values. The UE may receive the one or more MAC-CEs via one or more PDSCHs.

As shown by reference number 604 (e.g., using antenna 252, modem 254, MIMO detector 256, receive processor 258, controller/processor 280, and/or memory 282), the UE may receive, from the base station, one or more DCIs that indicate one or more TCI field codepoints indicated by the one or more MAC-CEs. The UE may receive the one or more DCIs using a DCI format 1_1/1_2, which may be with or without a PDSCH scheduling.

In some aspects, different TCI states may be indicated for different downlink/uplink channels/signals that are associated with different CORESETPoolIndex values in the case of a unified TCI indication.

In some aspects, in a first option, the UE may receive two MAC-CEs. A first MAC-CE may be associated with the first CORESET pool index value and a second MAC-CE may be associated with the second CORESET pool index value. The first MAC-CE may include a field that indicates the first CORESET pool index value and the second MAC-CE may include a field that indicates the second CORESET pool index value. The UE may receive two DCIs. A first DCI associated with a first TCI field codepoint may indicate the first CORESET pool index value and a second DCI associated with a second TCI field codepoint may indicate the second CORESET pool index value. An interpretation of a TCI field codepoint indicated by the first DCI or by the second DCI may be a function of the first CORESET pool index value of a CORESET in which the first DCI is detected, or may be a function of the second CORESET pool index value of a CORESET in which the second DCI is detected.

In some aspects, in the first option, a TCI state activation by MAC-CE and a DCI-based TCI state indication may be performed separately for different CORESETPoolIndex values. The DCI-based TCI state indication may be in case a MAC-CE activates more than one TCI state and maps to more than one TCI codepoint. In the first option, the TCI state activation by MAC-CE and the DCI-based TCI state indication may be performed separately for the different CORESETPoolIndex values using two separate MAC-CEs and two separate DCIs.

In some aspects, for a MAC-CE, a field in the MAC-CE may indicate a value of a CORESETPoolIndex. When the MAC-CE indicates a mapping to a single TCI codepoint (e.g., either one joint/downlink-only/uplink-only TCI state is mapped to a TCI codepoint, or one pair of downlink-only and uplink-only TCI states are mapped to a single TCI codepoint), the TCI codepoint may be applied to downlink/uplink channels/signals that are associated with that CORESETPoolIndex value starting from a given time. For example, the given time may be 3 ms after a HARQ-ACK associated with a PDSCH that carries the MAC-CE. Otherwise, the MAC-CE may activate TCI states, and a TCI state indication to be applied to downlink/uplink channels/signals that are associated with that CORESETPoolIndex value may be based at least in part on a subsequent DCI.

In some aspects, for the DCI, both an interpretation of a TCI field and an application of an indicated TCI codepoint may be a function of a CORESETPoolIndex value of a CORESET in which the DCI is detected. The DCI with a TCI field (e.g., DCI format 1_1/1_2) that is received in a CORESET associated with a given CORESETPoolIndex value may indicate a TCI codepoint from a set of TCI codepoints indicated by the MAC-CE with a same CORESETPoolIndex value field. The TCI codepoint indicated by the DCI may be applied to downlink/uplink channels/signals that are associated with that CORESETPoolIndex value starting from a given time (e.g., a first slot after Y symbols after a HARQ-ACK). The TCI codepoint may be mapped (e.g., by MAC-CE) to either one joint TCI state, one downlink-only TCI state, one uplink-only TCI state, or one pair of downlink-only and uplink-only TCI states. The TCI codepoint (or corresponding TCI state) may be applied to both downlink and uplink channels/signals, downlink-only channels/signals, uplink-only signals/channels, or both downlink and uplink channels/signals, respectively, that are associated with that CORESETPoolIndex value. Further, the DCI may be with or without scheduling a PDSCH.

In some aspects, in a second option, the UE may receive a single MAC-CE that is not associated with a specific CORESET pool index value. The single MAC-CE may not include a CORESET pool index value. The UE may receive two DCIs. A first DCI associated with a first TCI field codepoint may indicate the first CORESET pool index value and a second DCI associated with a second TCI field codepoint may indicate the second CORESET pool index value. An interpretation of a TCI field codepoint indicated by the first DCI or by the second DCI may not be a function of the first CORESET pool index value of a CORESET in which the first DCI is detected, or may not be a function of the second CORESET pool index value of a CORESET in which the second DCI is detected. An application of the TCI field codepoint may be a function of the first CORESET pool index value of the CORESET in which the first DCI is detected, or the second CORESET pool index value of the CORESET in which the second DCI is detected.

In some aspects, in the second option, a TCI state activation by MAC-CE may not be separate, but a DCI-based TCI state indication may be separate for different CORESETPoolIndex values. In the second option, the TCI state activation by MAC-CE and the DCI-based TCI state indication may be performed using a single MAC-CE and two separate DCIs.

In some aspects, for a MAC-CE, a CORESETPoolIndex field in the MAC-CE may not be needed. At least two TCI codepoints may be mapped by the MAC-CE. Otherwise, different DCIs may not be able to indicate different TCI states to be applied to different downlink/uplink channels/signals that are associated with different CORESETPoolIndex values. For a DCI, an interpretation of a TCI codepoint indicated by a TCI field of the DCI may not be a function of a CORESETPoolIndex value of a CORESET in which the DCI is detected. Further, an application of an indicated TCI codepoint may be a function of the CORESETPoolIndex value. The indicated TCI codepoint may be applied to downlink/uplink signals/channels associated with a CORESETPoolIndex value 0 or a CORESETPoolIndex value 1, depending on the CORESETPoolIndex value of the CORESET in which the DCI is detected.

In some aspects, in a third option, the UE may receive a single MAC-CE. The single MAC-CE may indicate, for each TCI field codepoint, a joint or downlink or uplink TCI state or a pair of downlink and uplink TCI states to be applied to one or more of the first CORESET pool index value or the second CORESET pool index value. The UE may receive a single DCI that indicates a single TCI field codepoint. An interpretation of the TCI field codepoint indicated by the single DCI may not be a function of a CORESET pool index value of a CORESET in which the single DCI is detected.

In some aspects, in the third option, a MAC-CE may map TCI states to TCI codepoints, where each TCI codepoint may also indicate whether a joint/downlink/uplink TCI state corresponds to a CORESETPoolIndex value 0, a CORESETPoolIndex value 1, or both a CORESETPoolIndex value 0 and a CORESETPoolIndex value 1. A DCI-based TCI state indication may indicate the TCI codepoint, and whether the TCI codepoint is applied to downlink/uplink channels/signals associated with the CORESETPoolIndex value 0, the CORESETPoolIndex value 1, or both the CORESETPoolIndex value 0 and the CORESETPoolIndex value 1 may depend on the indicated TCI codepoint. In the third option, a TCI state activation by MAC-CE and a DCI-based TCI state indication may be performed using a single MAC-CE and a single DCI.

In some aspects, for a MAC-CE, each TCI codepoint may be mapped to one of the following: one joint/downlink/uplink TCI state or a pair of downlink and uplink TCI states to be applied to CORESETPoolIndex 0 only and another joint/downlink/uplink TCI state or a pair of downlink and uplink TCI states to be applied to CORESETPoolIndex 1 only, or one joint/downlink/uplink TCI state or a pair of downlink and uplink TCI states to be applied to both CORESETPoolIndex values.

In some aspects, for a DCI, neither an interpretation of a TCI field of the DCI nor an application of an indicated TCI codepoint may depend on a CORESETPoolIndex value of a CORESET in which the DCI is detected. Instead, the TCI codepoint itself may determine the CORESETPoolIndex value of the CORESET in which the DCI is detected.

As shown by reference number 606, the UE may apply (e.g., using controller/processor 280 and/or memory 282) first unified TCI states, of the one or more unified TCI states, associated with the one or more TCI field codepoints to a signal or a channel associated with a first CORESET pool index value of the one or more CORESET pool index values. A unified TCI state of the first unified TCI states may be a downlink TCI state, an uplink TCI state, or a joint downlink and uplink TCI state. The signal may be an uplink signal or a downlink signal. The channel may be an uplink channel or a downlink channel.

As shown by reference number 608, the UE may apply (e.g., using controller/processor 280 and/or memory 282) second unified TCI states, of the one or more unified TCI states, associated with the one or more TCI field codepoints to a signal or a channel associated with a second CORESET pool index value of the one or more CORESET pool index values. A unified TCI state of the second unified TCI states may be associated with a downlink TCI state and/or an uplink TCI state.

In some aspects, the UE may apply the first unified TCI states and the second unified TCI states based at least in part on a UE capability or an RRC configuration received from the base station.

In some aspects, the first option (e.g., two separate MAC-CEs and two separate DCIs), the second option (e.g., a single MAC-CE and two separate DCIs), and/or the third option (e.g., a single MAC-CE and a single DCI) may be supported at the UE and/or at the base station based at least in part on a UE capability and an RRC configuration. The first option, the second option, and/or the third option may be supported at the UE and/or at the base station based at least in part on whether a DCI indicates a TCI codepoint (e.g., DCI formats 1_1/1_2 that have a TCI field) and schedules a PDSCH or does not schedule a PDSCH. When the DCI does not schedule the PDSCH, a sufficient quantity of unused bits may be available to indicate a TCI codepoint from a larger set of TCI codepoints. Further, the third option may require a larger number of TCI codepoints due to more possibilities, as compared to the first option and the second option, which may result in a TCI field being larger than 3 bits to indicate one possibility out of more than 8 possibilities.

In some aspects, the UE may apply the first unified TCI states to the signal or the channel associated with the first CORESET pool index value based at least in part on an association with the first CORESET pool index value. The UE may apply the second unified TCI states to the signal or the channel associated with the second CORESET pool index value based at least in part on an association with the second CORESET pool index value. The signal or the channel associated with the first CORESET pool index value or the signal or the channel associated with the second CORESET pool index value may include a PDCCH, channels or signals dynamically scheduled by a DCI different from the one or more DCIs, a CSI-RS, a periodic or semi-persistent PUCCH, an SRS, an SPS PDSCH, a HARQ-ACK, or a CG-PUSCH.

In some aspects, irrespective of whether the first option, the second option, and/or the third option are supported at the UE and the base station, applying a beam indication to downlink/uplink channels/signals may involve determining an association with a CORESETPoolIndex (either directly or indirectly). For a PDCCH, the association may be based at least in part on a CORESETPoolIndex value configured for a CORESET in which the PDCCH is received. When a CORESETPoolIndex value is not configured, a CORESETPoolIndex 0 may be assumed for that CORESET.

In some aspects, for channels/signals that are dynamically scheduled by a scheduling DCI (which may be different than a beam indication DCI), the association may be based at least in part on a CORESET configuration of the scheduling DCI. The association may be based at least in part on a CORESETPoolIndex value of a CORESET in which the scheduling DCI is detected. The channels/signals may include a PDSCH scheduled by a DCI (e.g., DCI formats 1_0, 1_1, 1_2), a HARQ-ACK transmitted on PUCCH for a PDSCH that is scheduled by a DCI (e.g., DCI formats 1_0, 1_1, 1_2), a PUSCH scheduled by a DCI (e.g., DCI formats 0_0, 0_1, 0_2), an aperiodic SRS triggered by a DCI (e.g., DCI format 0_1, 0_2, 1_1, 1_2), and/or an aperiodic CSI-RS triggered by a DCI (e.g., DCI format 0_1, 0_2).

In some aspects, for a CSI-RS including a periodic CSI-RS or a semi-persistent CSI-RS, the association may be based at least in part on a fixed rule (e.g. based at least in part on a CSI-RS resource ID or a CSI-RS resource set ID) or based at least in part on a higher-layer indication (e.g., an RRC/MAC-CE per CSI-RS resource or CSI-RS resource set). In some aspects, for a periodic or semi-persistent PUCCH including a periodic or semi-persistent CSI report or periodic SR transmission, the association may be based at least in part on a fixed rule (e.g., based at least in part on a PUCCH resource ID) or based at least in part on a higher-layer indication (e.g., an RRC/MAC-CE per PUCCH resource ID).

In some aspects, for an SRS transmission including a semi-persistent SRS or a periodic SRS, the association may be based at least in part on a fixed rule (e.g., based at least in part on an SRS resource ID or an SRS resource set ID) or based at least in part on a higher-layer indication (e.g., an RRC/MAC-CE per SRS resource or SRS resource set). In some aspects, for an SPS PDSCH, a HARQ-ACK transmitted on a PUCCH associated with an SPS PDSCH, or a Type 2 CG-PUSCH, the association may be based at least in part on an activation DCI that activates an SPS/CG (e.g., a CORESETPoolIndex value of a CORESET in which the activation DCI is detected), or based at least in part on a fixed rule (e.g., based at least in part on an SPS configuration ID or a CG configuration ID), or based at least in part on a higher-layer indication (e.g., an RRC per SPS configuration or CG configuration). For a Type 1 CG-PUSCH, the association may be based at least in part on the fixed rule or the higher-layer indication.

In some aspects, instead of the higher-layer indication, a similar outcome may be achieved by configuring each CSI-RS/SRS/PUCCH resource or resource set or each SPS configuration or CG configuration to belong to at least one of two groups, where each group may be associated with a CORESETPoolIndex value directly or indirectly. Further, in an absence of an explicit rule or higher-layer indication, a CORESETPoolIndex value 0 may be assumed for that downlink/uplink channel/signal.

As indicated above, FIG. 6 is provided as an example. Other examples may differ from what is described with regard to FIG. 6.

Figure 7:
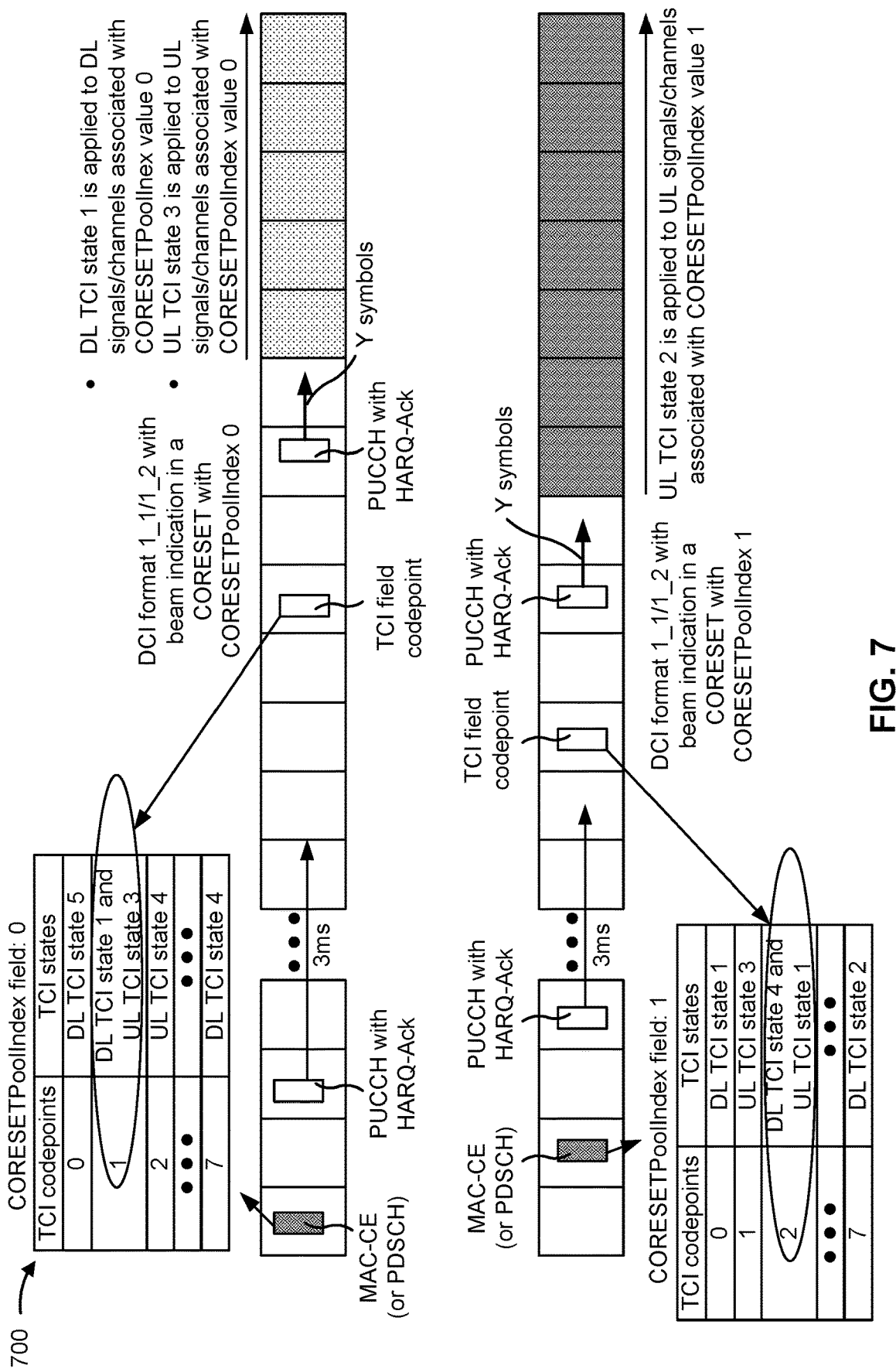

FIG. 7 is a diagram illustrating an example 700 associated with applying unified TCI states to signals or channels associated with CORESET pool index values, in accordance with the present disclosure.

In some aspects, a TCI state activation by MAC-CE and a DCI-based TCI state indication may be performed separately for different CORESETPoolIndex values using two separate MAC-CEs and two separate DCIs (e.g., the first option as described herein).

In some aspects, as shown in FIG. 7, a base station may transmit, to a UE, a first MAC-CE via a first PDSCH. The first MAC-CE may be associated with a first CORESETPoolIndex value (e.g., CORESETPoolIndex=0). The first MAC-CE may include a field that indicates the first CORESETPoolIndex value. The first MAC-CE may indicate a first table that maps a plurality of TCI codepoints to corresponding TCI states. As an example, the first table may indicate a TCI codepoint of "0" and a corresponding downlink TCI state 5, a TCI codepoint of "1" and a corresponding downlink TCI state 1 and uplink TCI state 3, a TCI codepoint of "2" and a corresponding uplink TCI state 4, and a TCI codepoint of "7" and a corresponding downlink TCI state 4. The base station may receive, from the UE, a HARQ-ACK via a PUCCH based at least in part on the first MAC-CE transmission. The base station may transmit, to the UE, a first DCI (e.g., DCI format 1_1/1_2) with a beam indication, with or without a PDSCH scheduling, and in a CORESET with CORESETPoolIndex value 0. The first DCI may indicate a TCI field codepoint (e.g., a TCI codepoint of "1"). The base station may receive, from the UE, a HARQ-ACK via a PUCCH based at least in part on the HARQ-ACK transmission. In this example, after Y symbols, downlink TCI state 1 may be applied to downlink signals/channels associated with the CORESETPoolIndex value 0, and uplink TCI state 3 may be applied to uplink signals/channels associated with CORESETPoolIndex value 0.

In some aspects, as further shown in FIG. 7, the base station may transmit, to the UE, a second MAC-CE via a second PDSCH. The second MAC-CE may be associated with a second CORESETPoolIndex value (e.g., CORESETPoolIndex=1). The second MAC-CE may include a field that indicates the second CORESETPoolIndex value. The second MAC-CE may indicate a second table that maps a plurality of TCI codepoints to corresponding TCI states. As an example, the second table may indicate a TCI codepoint of "0" and a corresponding downlink TCI state 1, a TCI codepoint of "1" and a corresponding uplink TCI state 3, a TCI codepoint of "2" and a corresponding downlink TCI state 4 and uplink TCI state 1, and a TCI codepoint of "7" and a corresponding uplink TCI state 2. The base station may receive, from the UE, a HARQ-ACK via a PUCCH based at least in part on the second MAC-CE transmission. The base station may transmit, to the UE, a second DCI (e.g., DCI format 1_1/1_2) with a beam indication, with or without a PDSCH scheduling, and in a CORESET with CORESETPoolIndex value 1. The second DCI may indicate a TCI field codepoint (e.g., a TCI codepoint of "7"). The base station may receive, from the UE, a HARQ-ACK via a PUCCH based at least in part on the HARQ-ACK transmission. In this example, after Y symbols, uplink TCI state 2 may be applied to uplink signals/channels associated with the CORESETPoolIndex value 1.

As indicated above, FIG. 7 is provided as an example. Other examples may differ from what is described with regard to FIG. 7.

Figure 8:
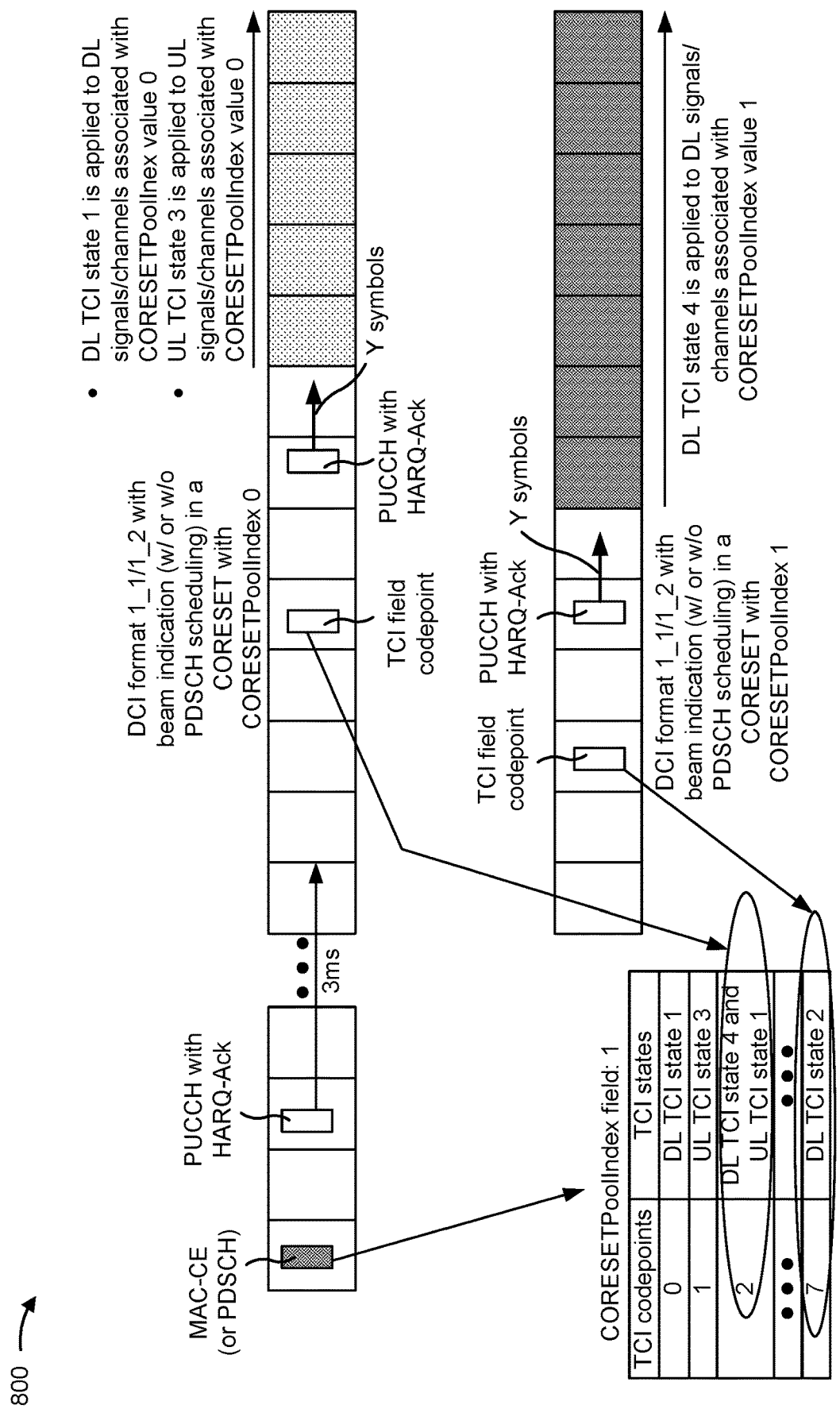

FIG. 8 is a diagram illustrating an example 800 associated with applying unified TCI states to signals or channels associated with CORESET pool index values, in accordance with the present disclosure.

In some aspects, a TCI state activation by MAC-CE and a DCI-based TCI state indication may be performed for different CORESETPoolIndex values using a single MAC-CE and two separate DCIs (e.g., the second option as described herein).

In some aspects, as shown in FIG. 8, a base station may transmit, to a UE, a MAC-CE via a PDSCH. The MAC-CE may be associated with a first CORESETPoolIndex value (e.g., CORESETPoolIndex=0) and a second CORESETPoolIndex value (e.g., CORESETPoolIndex=1), such that the MAC-CE does not include a field to indicate a CORESETPoolIndex value. The MAC-CE may indicate a table that maps a plurality of TCI codepoints to corresponding TCI states. As an example, the table may indicate a TCI codepoint of "0" and a corresponding downlink TCI state 5, a TCI codepoint of "1" and a corresponding downlink TCI state 1 and uplink TCI state 3, a TCI codepoint of "2" and a corresponding uplink TCI state 4, and a TCI codepoint of "7" and a corresponding downlink TCI state 4. The base station may receive, from the UE, a HARQ-ACK via a PUCCH based at least in part on the MAC-CE transmission.

In some aspects, as further shown in FIG. 8, the base station may transmit, to the UE, a first DCI (e.g., DCI format 1_1/1_2) with a beam indication, with or without a PDSCH scheduling, and in a CORESET with CORESETPoolIndex value 0. The first DCI may indicate a TCI field codepoint (e.g., a TCI codepoint of "1"). The base station may receive, from the UE, a HARQ-ACK via a PUCCH based at least in part on the HARQ-ACK transmission. In this example, after Y symbols, downlink TCI state 1 may be applied to downlink signals/channels associated with the CORESETPoolIndex value 0, and uplink TCI state 3 may be applied to uplink signals/channels associated with CORESETPoolIndex value 0.

In some aspects, as further shown in FIG. 8, the base station may transmit, to the UE, a second DCI (e.g., DCI format 1_1/1_2) with a beam indication, with or without a PDSCH scheduling, and in a CORESET with CORESETPoolIndex value 1. The second DCI may indicate a TCI field codepoint (e.g., a TCI codepoint of "7"). The base station may receive, from the UE, a HARQ-ACK via a PUCCH based at least in part on the HARQ-ACK transmission. In this example, after Y symbols, downlink TCI state 4 may be applied to downlink signals/channels associated with the CORESETPoolIndex value 1.

As indicated above, FIG. 8 is provided as an example. Other examples may differ from what is described with regard to FIG. 8.

FIG. 9 is a diagram illustrating an example 900 associated with applying unified TCI states to signals or channels associated with CORESET pool index values, in accordance with the present disclosure.

In some aspects, a TCI state activation by MAC-CE and a DCI-based TCI state indication may be performed for different CORESETPoolIndex values using a single MAC-CE and a single DCI (e.g., the third option as described herein).

In some aspects, as shown in FIG. 9, a base station may transmit, to a UE, a MAC-CE via a PDSCH. The MAC-CE may indicate a table that maps a plurality of TCI codepoints to corresponding TCI states, where each TCI state may be associated with a first CORESETPoolIndex value (e.g., CORESETPoolIndex=0) and/or a second CORESETPoolIndex value (e.g., CORESETPoolIndex=1). As an example, the table may indicate a TCI codepoint of "0" and a corresponding downlink TCI state 5 for CORESETPoolIndex 0, a TCI codepoint of "1" and a corresponding downlink TCI state 1 and uplink TCI state 3 for CORESETPoolIndex 0 and uplink TCI state 2 for CORESETPoolIndex 1, a TCI codepoint of "2" and a corresponding uplink TCI state 4 for both CORESETPoolIndex 0 and CORESETPoolIndex 1, and a TCI codepoint of "7" and a corresponding downlink TCI state 2 and uplink TCI state 5 for CORESETPoolIndex 0 and downlink TCI state 3 and uplink TCI state 2 for CORESETPoolIndex 1. The base station may receive, from the UE, a HARQ-ACK via a PUCCH based at least in part on the MAC-CE transmission.

In some aspects, as further shown in FIG. 9, the base station may transmit, to the UE, a DCI (e.g., DCI format 1_1/1_2) with a beam indication with or without a PDSCH scheduling. The DCI may indicate a TCI field codepoint (e.g., a TCI codepoint of "1"). The base station may receive, from the UE, a HARQ-ACK via a PUCCH based at least in part on the HARQ-ACK transmission. In this example, after Y symbols, downlink TCI state 1 may be applied to downlink signals/channels associated with the CORESETPoolIndex value 0, uplink TCI state 3 may be applied to uplink signals/channels associated with CORESETPoolIndex value 0, and uplink TCI state 2 may be applied to uplink signals/channels associated with CORESETPoolIndex value 1.

As indicated above, FIG. 9 is provided as an example. Other examples may differ from what is described with regard to FIG. 9.

Figure 10:
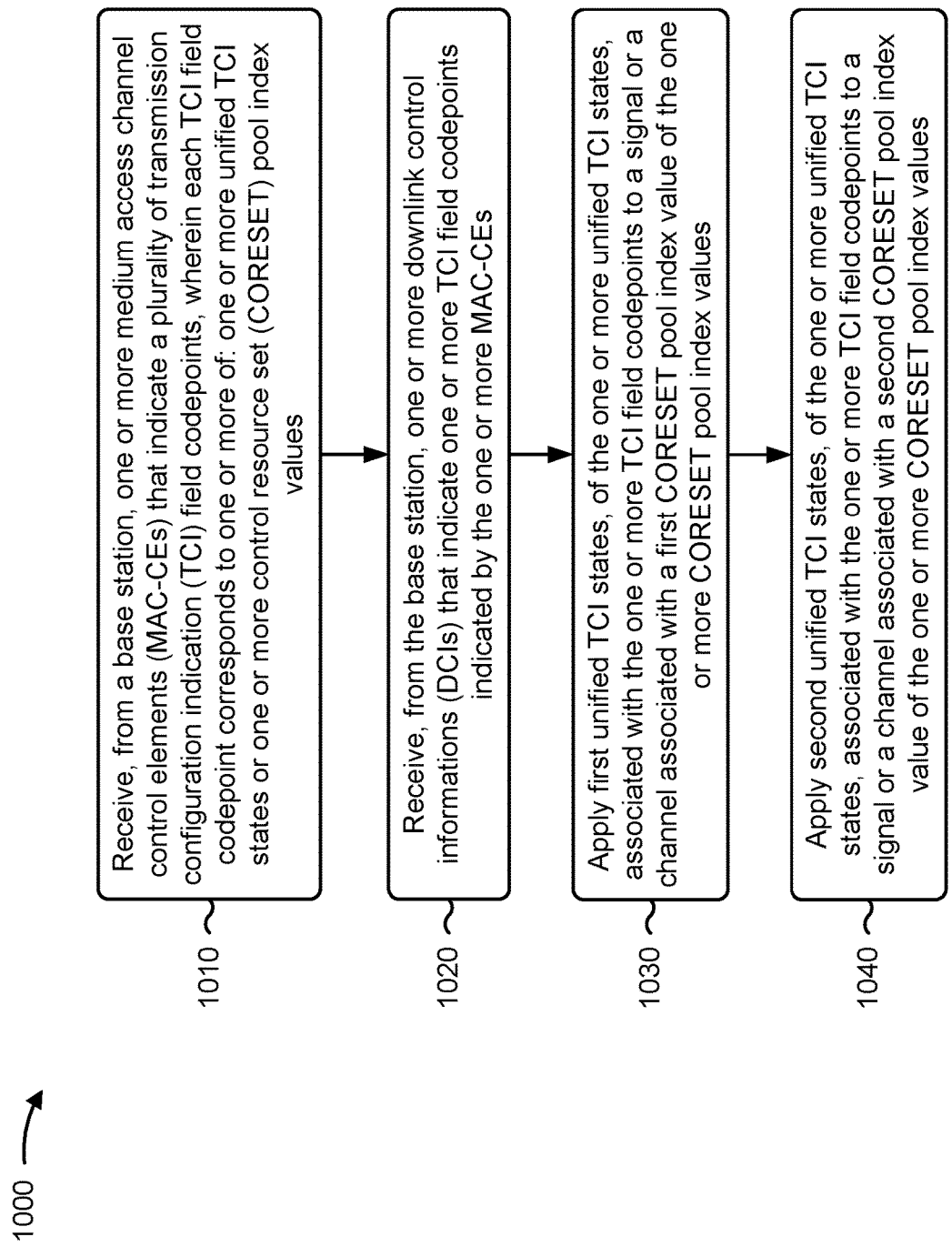
FIGS. 10-11 are diagrams illustrating example processes associated with applying unified TCI states to signals or channels associated with CORESET pool index values, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with applying unified TCI states to signals or channels associated with CORESET pool index values.

As shown in FIG. 10, in some aspects, process 1000 may include receiving, from a base station, one or more MAC-CEs that indicate a plurality of TCI field codepoints, wherein each TCI field codepoint corresponds to one or more of: one or more unified TCI states or one or more CORESET pool index values (block 1010). For example, the UE (e.g., using communication manager 140 and/or reception component 1202, depicted in FIG. 12) may receive, from a base station, one or more MAC-CEs that indicate a plurality of TCI field codepoints, wherein each TCI field codepoint corresponds to one or more of: one or more unified TCI states or one or more CORESET pool index values, as described above.

As further shown in FIG. 10, in some aspects, process 1000 may include receiving, from the base station, one or more DCIs that indicate one or more TCI field codepoints indicated by the one or more MAC-CEs (block 1020). For example, the UE (e.g., using communication manager 140 and/or reception component 1202, depicted in FIG. 12) may receive, from the base station, one or more DCIs that indicate one or more TCI field codepoints indicated by the one or more MAC-CEs, as described above.

As further shown in FIG. 10, in some aspects, process 1000 may include applying first unified TCI states, of the one or more unified TCI states, associated with the one or more TCI field codepoints to a signal or a channel associated with a first CORESET pool index value of the one or more CORESET pool index values (block 1030). For example, the UE (e.g., using communication manager 140 and/or application component 1208, depicted in FIG. 12) may apply first unified TCI states, of the one or more unified TCI states, associated with the one or more TCI field codepoints to a signal or a channel associated with a first CORESET pool index value of the one or more CORESET pool index values, as described above.

As further shown in FIG. 10, in some aspects, process 1000 may include applying second unified TCI states, of the one or more unified TCI states, associated with the one or more TCI field codepoints to a signal or a channel associated with a second CORESET pool index value of the one or more CORESET pool index values (block 1040). For example, the UE (e.g., using communication manager 140 and/or application component 1208, depicted in FIG. 12) may apply second unified TCI states, of the one or more unified TCI states, associated with the one or more TCI field codepoints to a signal or a channel associated with a second CORESET pool index value of the one or more CORESET pool index values, as described above.

Process 1000 may include additional aspects, such as any single aspect or any combination of aspects described below and/or in connection with one or more other processes described elsewhere herein.

In a first aspect, a unified TCI state of the one or more unified TCI states, the first unified TCI states, or the second unified TCI states is associated with one or more of a downlink TCI state or an uplink TCI state.

In a second aspect, alone or in combination with the first aspect, process 1000 includes receiving two MAC-CEs, wherein a first MAC-CE is associated with the first CORE- SET pool index value and a second MAC-CE is associated with the second CORESET pool index value; and receiving two DCIs, wherein a first DCI associated with a first TCI field codepoint indicates the first CORESET pool index value and a second DCI associated with a second TCI field codepoint indicates the second CORESET pool index value.

In a third aspect, alone or in combination with one or more of the first and second aspects, the first MAC-CE includes a field that indicates the first CORESET pool index value and the second MAC-CE includes a field that indicates the second CORESET pool index value, and an interpretation of a TCI field codepoint indicated by the first DCI or by the second DCI is a function of: the first CORESET pool index value of a CORESET in which the first DCI is detected, or the second CORESET pool index value of a CORESET in which the second DCI is detected.

In a fourth aspect, alone or in combination with one or more of the first through third aspects, process 1000 includes receiving a single MAC-CE that is not associated with a specific CORESET pool index value; and receiving two DCIs, wherein a first DCI indicates a first TCI field codepoint associated with the first CORESET pool index value and a second DCI indicates a second TCI field codepoint associated with the second CORESET pool index value.

In a fifth aspect, alone or in combination with one or more of the first through fourth aspects, the single MAC-CE does not include a CORESET pool index value, and an interpretation of a TCI field codepoint indicated by the first DCI or by the second DCI is not a function of: the first CORESET pool index value of a CORESET in which the first DCI is detected, or the second CORESET pool index value of a CORESET in which the second DCI is detected, and wherein an application of the TCI field codepoint is a function of: the first CORESET pool index value of the CORESET in which the first DCI is detected, or the second CORESET pool index value of the CORESET in which the second DCI is detected.

In a sixth aspect, alone or in combination with one or more of the first through fifth aspects, process 1000 includes receiving a single MAC-CE; and receiving a single DCI that indicates a single TCI field codepoint.

In a seventh aspect, alone or in combination with one or more of the first through sixth aspects, the single MAC-CE indicates, for each TCI field codepoint, a joint or downlink or uplink TCI state or a pair of downlink and uplink TCI states to be applied to one or more of the first CORESET pool index value or the second CORESET pool index value, and an interpretation of the TCI field codepoint indicated by the single DCI is not a function of a CORESET pool index value of a CORESET in which the single DCI is detected.

In an eighth aspect, alone or in combination with one or more of the first through seventh aspects, applying the first unified TCI states and applying the second unified TCI states is based at least in part on a UE capability or an RRC configuration received from the base station.

In a ninth aspect, alone or in combination with one or more of the first through eighth aspects, process 1000 includes applying the first unified TCI states to the signal or the channel associated with the first CORESET pool index value based at least in part on an association with the first CORESET pool index value; and applying the second unified TCI states to the signal or the channel associated with the second CORESET pool index value based at least in part on an association with the second CORESET pool index value, wherein the signal or the channel associated with the first CORESET pool index value or the signal or the channel associated with the second CORESET pool index value includes one or more of a PDCCH, channels or signals dynamically scheduled by a DCI different from the one or more DCIs, a CSI-RS, a periodic or semi-persistent PUCCH, an SRS, an SPS PDSCH, a HARQ ACK, or a CG-PUSCH.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
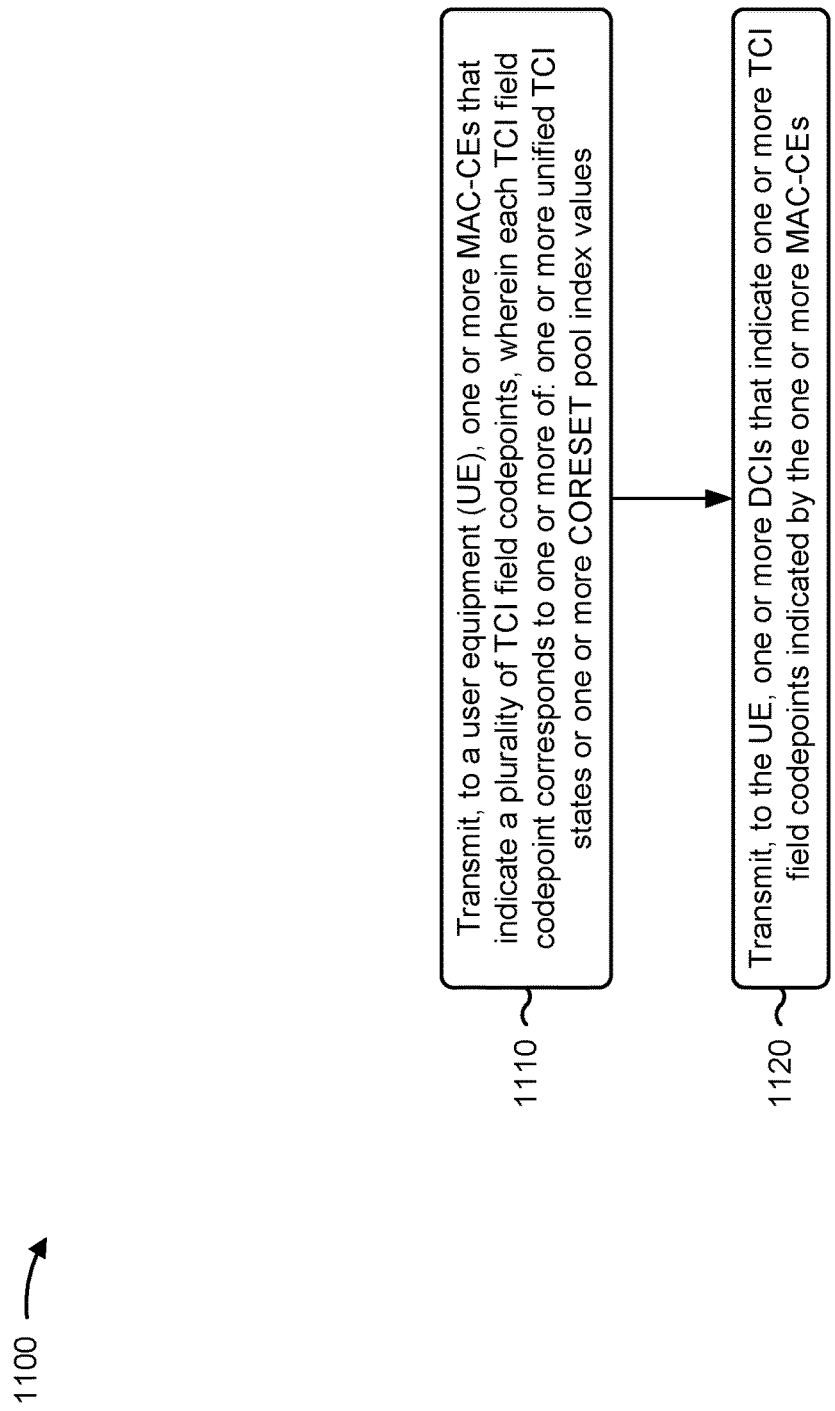

FIG. 11 is a diagram illustrating an example process 1100 performed, for example, by a base station, in accordance with the present disclosure. Example process 1100 is an example where the base station (e.g., base station 110) performs operations associated with applying unified TCI states to signals or channels associated with CORESET pool index values.

As shown in FIG. 11, in some aspects, process 1100 may include transmitting, to a UE, one or more MAC-CEs that indicate a plurality of TCI field codepoints, wherein each TCI field codepoint corresponds to one or more of: one or more unified TCI states or one or more CORESET pool index values (block 1110). For example, the base station (e.g., using transmission component 1304, depicted in FIG. 13) may transmit, to a UE, one or more MAC-CEs that indicate a plurality of TCI field codepoints, wherein each TCI field codepoint corresponds to one or more of: one or more unified TCI states or one or more CORESET pool index values, as described above.

As further shown in FIG. 11, in some aspects, process 1100 may include transmitting, to the UE, one or more DCIs that indicate one or more TCI field codepoints indicated by the one or more MAC-CEs (block 1120). For example, the base station (e.g., using transmission component 1304, depicted in FIG. 13) may transmit, to the UE, one or more DCIs that indicate one or more TCI field codepoints indicated by the one or more MAC-CEs, as described above.

Process 1100 may include additional aspects, such as any single aspect or any combination of aspects described below and/or in connection with one or more other processes described elsewhere herein.

In a first aspect, first unifying TCI states, of the one or more unified TCI states, associated with the one or more TCI field codepoints, are applied to a signal or a channel associated with a first CORESET pool index value of the one or more CORESET pool index values, and second unifying TCI states, of the one or more unified TCI states, associated with the one or more TCI field codepoints, are applied to a signal or a channel associated with a second CORESET pool index value of the one or more CORESET pool index values.

In a second aspect, alone or in combination with the first aspect, process 1100 includes transmitting two MAC-CEs, wherein a first MAC-CE is associated with the first CORESET pool index value and a second MAC-CE is associated with the second CORESET pool index value; and transmitting two DCIs, wherein a first DCI associated with a first TCI field codepoint indicates the first CORESET pool index value and a second DCI associated with a second TCI field codepoint indicates the second CORESET pool index value.

In a third aspect, alone or in combination with one or more of the first and second aspects, process 1100 includes transmitting a single MAC-CE that is not associated with a specific CORESET pool index value, and transmitting two DCIs, wherein a first DCI indicates a first TCI field codepoint associated with the first CORESET pool index value and a second DCI indicates a second TCI field codepoint associated with the second CORESET pool index value.

In a fourth aspect, alone or in combination with one or more of the first through third aspects, process 1100 includes transmitting a single MAC-CE, and transmitting a single DCI that indicates a single TCI field codepoint.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
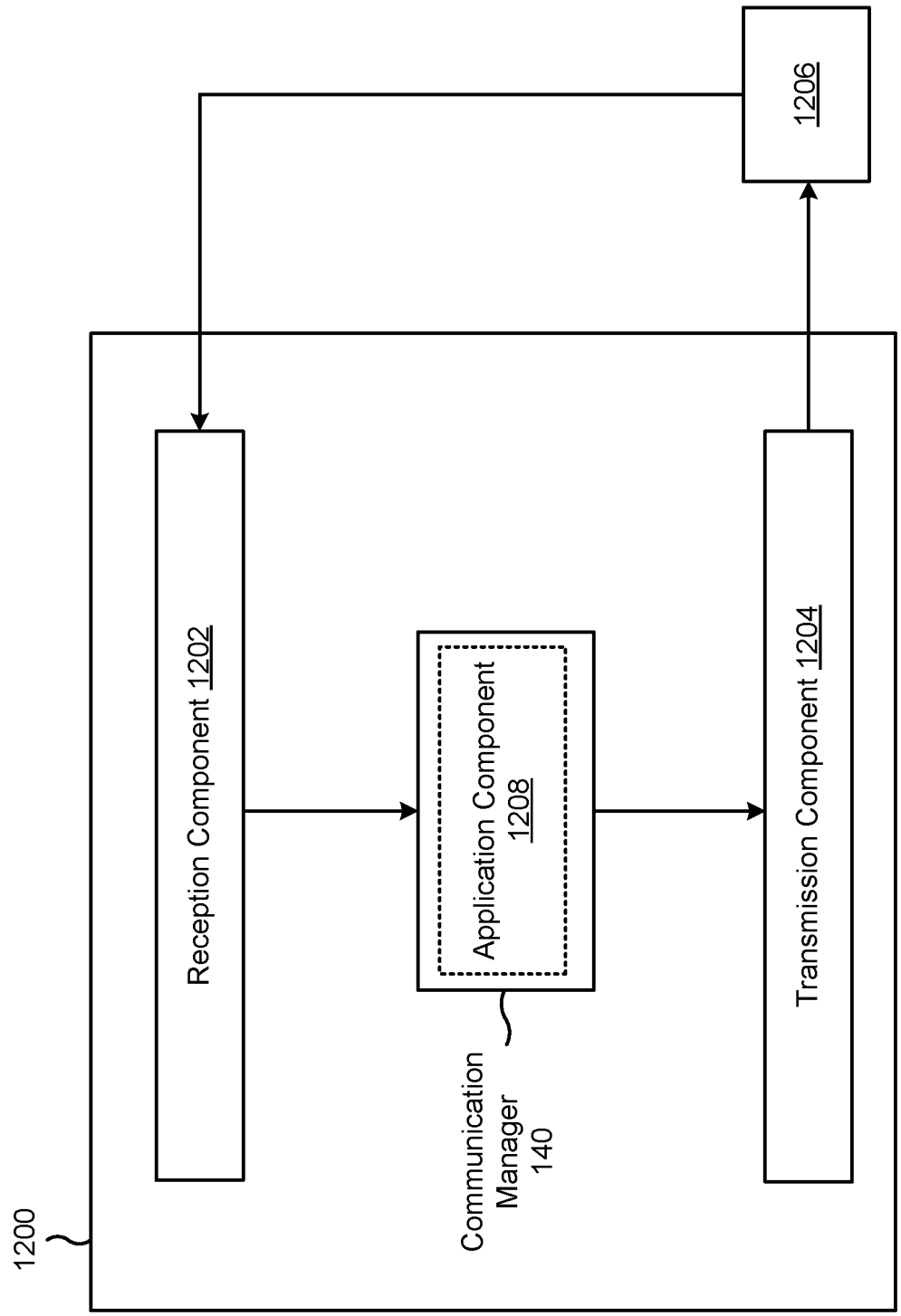
FIGS. 12-13 are diagrams of example apparatuses for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include an application component 1208, among other examples.

In some aspects, the apparatus 1200 may be configured to perform one or more operations described herein in connection with FIGS. 6-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive, from a base station, one or more MAC-CEs that indicate a plurality of TCI field codepoints, wherein each TCI field codepoint corresponds to one or more of: one or more unified TCI states or one or more CORESET pool index values. The reception component 1202 may receive, from the base station, one or more DCIs that indicate one or more TCI field codepoints indicated by the one or more MAC-CEs. The application component 1208 may apply first unified TCI states, of the one or more unified TCI states, associated with the one or more TCI field codepoints to a signal or a channel associated with a first CORESET pool index value of the one or more CORESET pool index values. The application component 1208 may apply second unified TCI states, of the one or more unified TCI states, associated with the one or more TCI field codepoints to a signal or a channel associated with a second CORESET pool index value of the one or more CORESET pool index values.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
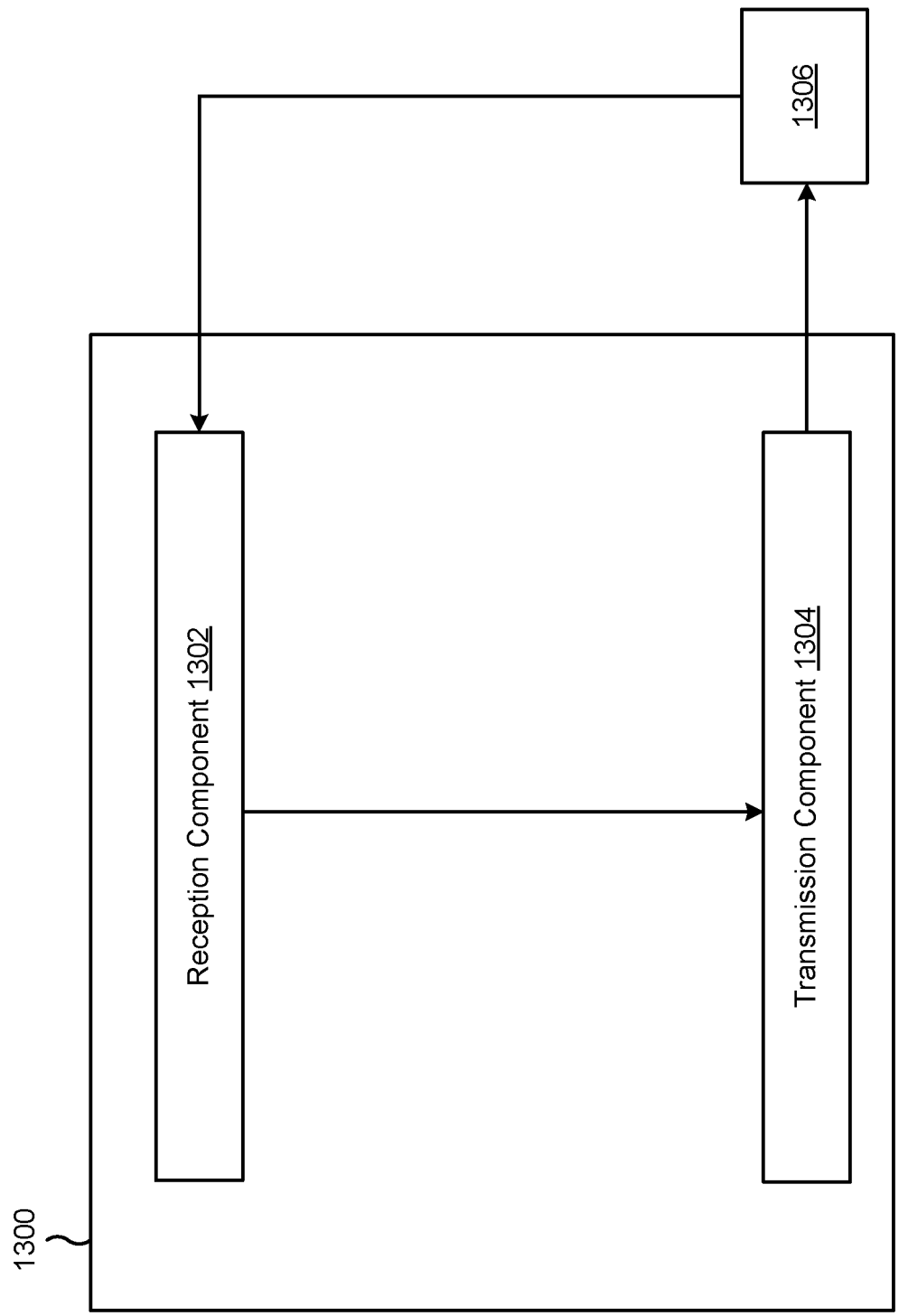

FIG. 13 is a diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304.

In some aspects, the apparatus 1300 may be configured to perform one or more operations described herein in connection with FIGS. 6-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2.

Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver.

The transmission component 1304 may transmit, to a UE, one or more MAC-CEs that indicate a plurality of TCI field codepoints, wherein each TCI field codepoint corresponds to one or more of: one or more unified TCI states or one or more CORESET pool index values. The transmission component 1304 may transmit, to the UE, one or more DCIs that indicate one or more TCI field codepoints indicated by the one or more MAC-CEs.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving, from a base station, one or more medium access channel control elements (MAC-CEs) that indicate a plurality of transmission configuration indication (TCI) field codepoints, wherein each TCI field codepoint corresponds to one or more of: one or more unified TCI states or one or more control resource set (CORESET) pool index values; receiving, from the base station, one or more downlink control informations (DCIs) that indicate one or more TCI field codepoints indicated by the one or more MAC-CEs; applying first unified TCI states, of the one or more unified TCI states, associated with the one or more TCI field codepoints to a signal or a channel associated with a first CORESET pool index value of the one or more CORESET pool index values; and applying second unified TCI states, of the one or more unified TCI states, associated with the one or more TCI field codepoints to a signal or a channel associated with a second CORESET pool index value of the one or more CORESET pool index values.

Aspect 2: The method of Aspect 1, wherein a unified TCI state of the one or more unified TCI states, the first unified TCI states, or the second unified TCI states is associated with one or more of a downlink TCI state or an uplink TCI state.

Aspect 3: The method of any of Aspects 1 through 2, wherein: receiving the one or more MAC-CEs comprises receiving two MAC-CEs, wherein a first MAC-CE is associated with the first CORESET pool index value and a second MAC-CE is associated with the second CORESET pool index value; and receiving the one or more DCIs comprises receiving two DCIs, wherein a first DCI associated with a first TCI field codepoint indicates the first CORESET pool index value and a second DCI associated with a second TCI field codepoint indicates the second CORESET pool index value.

Aspect 4: The method of Aspect 3, wherein: the first MAC-CE includes a field that indicates the first CORESET pool index value and the second MAC-CE includes a field that indicates the second CORESET pool index value; and an interpretation of a TCI field codepoint indicated by the first DCI or by the second DCI is a function of: the first CORESET pool index value of a CORESET in which the first DCI is detected, or the second CORESET pool index value of a CORESET in which the second DCI is detected.

Aspect 5: The method of any of Aspects 1 through 4, wherein: receiving the one or more MAC-CEs comprises receiving a single MAC-CE that is not associated with a specific CORESET pool index value; and receiving the one or more DCIs comprises receiving two DCIs, wherein a first DCI indicates a first TCI field codepoint associated with the first CORESET pool index value and a second DCI indicates a second TCI field codepoint associated with the second CORESET pool index value.

Aspect 6: The method of Aspect 5, wherein: the single MAC-CE does not include a CORESET pool index value; and an interpretation of a TCI field codepoint indicated by the first DCI or by the second DCI is not a function of: the first CORESET pool index value of a CORESET in which the first DCI is detected, or the second CORESET pool index value of a CORESET in which the second DCI is detected, and wherein an application of the TCI field codepoint is a function of: the first CORESET pool index value of the CORESET in which the first DCI is detected, or the second CORESET pool index value of the CORESET in which the second DCI is detected.

Aspect 7: The method of any of Aspects 1 through 6, wherein: receiving the one or more MAC-CEs comprises receiving a single MAC-CE; and receiving the one or more DCIs comprises receiving a single DCI that indicates a single TCI field codepoint.

Aspect 8: The method of Aspect 7, wherein: the single MAC-CE indicates, for each TCI field codepoint, a joint or downlink or uplink TCI state or a pair of downlink and uplink TCI states to be applied to one or more of the first CORESET pool index value or the second CORESET pool index value; and an interpretation of the TCI field codepoint indicated by the single DCI is not a function of a CORESET pool index value of a CORESET in which the single DCI is detected.

Aspect 9: The method of any of Aspects 1 through 8, wherein applying the first unified TCI states and applying the second unified TCI states is based at least in part on a UE capability or a radio resource control configuration received from the base station.

Aspect 10: The method of any of Aspects 1 through 9, wherein: applying the first unified TCI states to the signal or the channel associated with the first CORESET pool index value is based at least in part on an association with the first CORESET pool index value; and applying the second unified TCI states to the signal or the channel associated with the second CORESET pool index value is based at least in part on an association with the second CORESET pool index value, wherein the signal or the channel associated with the first CORESET pool index value or the signal or the channel associated with the second CORESET pool index value includes one or more of: a physical downlink control channel, channels or signals dynamically scheduled by a DCI different from the one or more DCIs, a channel state information reference signal, a periodic or semi-persistent physical uplink control channel, a sounding reference signal, a semi-persistent scheduling physical downlink shared channel, a hybrid automatic repeat request acknowledgement, or a configured grant physical uplink shared channel.

Aspect 11: A method of wireless communication performed by a base station, comprising: transmitting, to a user equipment (UE), one or more medium access channel control elements (MAC-CEs) that indicate a plurality of transmission configuration indication (TCI) field codepoints, wherein each TCI field codepoint corresponds to one or more of: one or more unified TCI states or one or more control resource set (CORESET) pool index values; and transmitting, to the UE, one or more downlink control informations (DCIs) that indicate one or more TCI field codepoints indicated by the one or more MAC-CEs.

Aspect 12: The method of Aspect 11, wherein: first unified TCI states, of the one or more unified TCI states, associated with the one or more TCI field codepoints are applied to a signal or a channel associated with a first CORESET pool index value of the one or more CORESET pool index values; and second unified TCI states, of the one or more unified TCI states, associated with the one or more TCI field codepoints are applied to a signal or a channel associated with a second CORESET pool index value of the one or more CORESET pool index values.

Aspect 13: The method of any of Aspects 11 through 12, wherein: transmitting the one or more MAC-CEs comprises transmitting two MAC-CEs, wherein a first MAC-CE is associated with the first CORESET pool index value and a second MAC-CE is associated with the second CORESET pool index value; and transmitting the one or more DCIs comprises transmitting two DCIs, wherein a first DCI associated with a first TCI field codepoint indicates the first CORESET pool index value and a second DCI associated with a second TCI field codepoint indicates the second CORESET pool index value.

Aspect 14: The method of any of Aspects 11 through 13, wherein: transmitting the one or more MAC-CEs comprises transmitting a single MAC-CE that is not associated with a specific CORESET pool index value; and transmitting the one or more DCIs comprises transmitting two DCIs, wherein a first DCI indicates a first TCI field codepoint associated with the first CORESET pool index value and a second DCI indicates a second TCI field codepoint associated with the second CORESET pool index value.

Aspect 15: The method of any of Aspects 11 through 14, wherein: transmitting the one or more MAC-CEs comprises transmitting a single MAC-CE that is associated with the first CORESET pool index value and the second CORESET pool index value; and transmitting the one or more DCIs comprises transmitting a single DCI that indicates a single TCI field codepoint.

Aspect 16: An apparatus for wireless communication at a device, comprising a processor; memory coupled with the processor; and instructions stored in the memory and executable by the processor to cause the apparatus to perform the method of one or more of Aspects 1-10.

Aspect 17: A device for wireless communication, comprising a memory and one or more processors coupled to the memory, the one or more processors configured to perform the method of one or more of Aspects 1-10.

Aspect 18: An apparatus for wireless communication, comprising at least one means for performing the method of one or more of Aspects 1-10.

Aspect 19: A non-transitory computer-readable medium storing code for wireless communication, the code comprising instructions executable by a processor to perform the method of one or more of Aspects 1-10.

Aspect 20: A non-transitory computer-readable medium storing a set of instructions for wireless communication, the set of instructions comprising one or more instructions that, when executed by one or more processors of a device, cause the device to perform the method of one or more of Aspects 1-10.

Aspect 21: An apparatus for wireless communication at a device, comprising a processor; memory coupled with the processor; and instructions stored in the memory and executable by the processor to cause the apparatus to perform the method of one or more of Aspects 11-15.

Aspect 22: A device for wireless communication, comprising a memory and one or more processors coupled to the memory, the one or more processors configured to perform the method of one or more of Aspects 11-15.

Aspect 23: An apparatus for wireless communication, comprising at least one means for performing the method of one or more of Aspects 11-15.

Aspect 24: A non-transitory computer-readable medium storing code for wireless communication, the code comprising instructions executable by a processor to perform the method of one or more of Aspects 11-15.

Aspect 25: A non-transitory computer-readable medium storing a set of instructions for wireless communication, the set of instructions comprising one or more instructions that, when executed by one or more processors of a device, cause the device to perform the method of one or more of Aspects 11-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a base station, one or more medium access control control elements (MAC-CEs) that indicate a plurality of transmission configuration indication (TCI) field codepoints, wherein each TCI field codepoint corresponds to one or more unified TCI states and one or more control resource set (CORESET) pool index values;
   receiving, from the base station, a plurality of downlink control informations (DCIs), from respective transmission reception points (TRPs), that indicate one or more TCI field codepoints indicated by the one or more MAC-CEs, wherein the one or more TCI field codepoints indicate respective CORESET pool index values;
   applying first unified TCI states, of the one or more unified TCI states, associated with the one or more TCI field codepoints to a signal or a channel associated with a first CORESET pool index value of the one or more CORESET pool index values; and
   applying second unified TCI states, of the one or more unified TCI states, associated with the one or more TCI field codepoints to a signal or a channel associated with a second CORESET pool index value of the one or more CORESET pool index values.

2. The method of claim 1, wherein a unified TCI state of the one or more unified TCI states, the first unified TCI states, or the second unified TCI states is associated with one or more of a downlink TCI state or an uplink TCI state.

3. The method of claim 1, wherein:
   receiving the one or more MAC-CEs comprises receiving two MAC-CEs, wherein a first MAC-CE is associated with the first CORESET pool index value and a second MAC-CE is associated with the second CORESET pool index value; and
   receiving the plurality of DCIs comprises receiving two DCIs, wherein a first DCI associated with a first TCI field codepoint indicates the first CORESET pool index value and a second DCI associated with a second TCI field codepoint indicates the second CORESET pool index value.

4. The method of claim 3, wherein:
   the first MAC-CE includes a field that indicates the first CORESET pool index value and the second MAC-CE includes a field that indicates the second CORESET pool index value; and
   an interpretation of a TCI field codepoint indicated by the first DCI or by the second DCI is a function of: the first CORESET pool index value of a CORESET in which the first DCI is detected, or the second CORESET pool index value of a CORESET in which the second DCI is detected.

5. The method of claim 1, wherein:
   receiving the one or more MAC-CEs comprises receiving a single MAC-CE that is not associated with a specific CORESET pool index value; and
   receiving the plurality of DCIs comprises receiving two DCIs, wherein a first DCI indicates a first TCI field codepoint associated with the first CORESET pool index value and a second DCI indicates a second TCI field codepoint associated with the second CORESET pool index value.

6. The method of claim 5, wherein:
the single MAC-CE does not include a CORESET pool index value; and
an interpretation of a TCI field codepoint indicated by the first DCI or by the second DCI is not a function of: the first CORESET pool index value of a CORESET in which the first DCI is detected, or the second CORESET pool index value of a CORESET in which the second DCI is detected, and wherein an application of the TCI field codepoint is a function of: the first CORESET pool index value of the CORESET in which the first DCI is detected, or the second CORESET pool index value of the CORESET in which the second DCI is detected.

7. The method of claim 1, wherein:
receiving the one or more MAC-CEs comprises receiving a single MAC-CE; and
receiving the plurality of DCIs comprises receiving at least one DCI that indicates a single TCI field codepoint.

8. The method of claim 7, wherein:
the single MAC-CE indicates, for each TCI field codepoint, a joint or downlink or uplink TCI state or a pair of downlink and uplink TCI states to be applied to one or more of the first CORESET pool index value or the second CORESET pool index value; and
an interpretation of the TCI field codepoint indicated by the DCI is not a function of a CORESET pool index value of a CORESET in which the DCI is detected.

9. The method of claim 1, wherein applying the first unified TCI states and applying the second unified TCI states is based at least in part on a UE capability or a radio resource control configuration received from the base station.

10. The method of claim 1, wherein:
applying the first unified TCI states to the signal or the channel associated with the first CORESET pool index value is based at least in part on an association with the first CORESET pool index value; and
applying the second unified TCI states to the signal or the channel associated with the second CORESET pool index value is based at least in part on an association with the second CORESET pool index value,
wherein the signal or the channel associated with the first CORESET pool index value or the signal or the channel associated with the second CORESET pool index value includes one or more of: a physical downlink control channel, channels or signals dynamically scheduled by a DCI different from the plurality of DCIs, a channel state information reference signal, a periodic or semi-persistent physical uplink control channel, a sounding reference signal, a semi-persistent scheduling physical downlink shared channel, a hybrid automatic repeat request acknowledgement, or a configured grant physical uplink shared channel.

11. A method of wireless communication performed by a base station, comprising:
transmitting, to a user equipment (UE), one or more medium access control control elements (MAC-CEs) that indicate a plurality of transmission configuration indication (TCI) field codepoints, wherein each TCI field codepoint corresponds to one or more of: one or more unified TCI states and one or more control resource set (CORESET) pool index values; and
transmitting, to the UE, a plurality of downlink control informations (DCIs), via respective transmission reception points (TRPs), that indicate one or more TCI field codepoints indicated by the one or more MAC-CEs, wherein the one or more TCI field codepoints indicate respective CORESET pool index values.

12. The method of claim 11, wherein:
first unified TCI states, of the one or more unified TCI states, associated with the one or more TCI field codepoints are applied to a signal or a channel associated with a first CORESET pool index value of the one or more CORESET pool index values; and
second unified TCI states, of the one or more unified TCI states, associated with the one or more TCI field codepoints are applied to a signal or a channel associated with a second CORESET pool index value of the one or more CORESET pool index values.

13. The method of claim 11, wherein:
transmitting the one or more MAC-CEs comprises transmitting two MAC-CEs, wherein a first MAC-CE is associated with a first CORESET pool index value and a second MAC-CE is associated with the second CORESET pool index value; and
transmitting the plurality of one or more-DCIs comprises transmitting two DCIs, wherein a first DCI associated with a first TCI field codepoint indicates the first CORESET pool index value and a second DCI associated with a second TCI field codepoint indicates a second CORESET pool index value.

14. The method of claim 11, wherein:
transmitting the one or more MAC-CEs comprises transmitting a single MAC-CE that is not associated with a specific CORESET pool index value; and
transmitting the plurality of DCIs comprises transmitting two DCIs, wherein a first DCI indicates a first TCI field codepoint associated with a first CORESET pool index value and a second DCI indicates a second TCI field codepoint associated with a second CORESET pool index value.

15. The method of claim 11, wherein:
transmitting the one or more MAC-CEs comprises transmitting a single MAC-CE that is associated with a first CORESET pool index value and a second CORESET pool index value; and
transmitting the plurality of DCIs comprises transmitting a single DCI that indicates a single TCI field codepoint.

16. An apparatus for wireless communication at a user equipment (UE), comprising:
one or more memories; and
one or more processors, coupled to the one or more memories, configured to:
receive, from a base station, one or more medium access control control elements (MAC-CEs) that indicate a plurality of transmission configuration indication (TCI) field codepoints, wherein each TCI field codepoint corresponds to one or more unified TCI states and one or more control resource set (CORESET) pool index values;
receive, from the base station, a plurality of downlink control informations (DCIs), from respective transmission reception points (TRPs), that indicate one or more TCI field codepoints indicated by the one or more MAC-CEs, wherein the one or more TCI field codepoints indicate respective CORESET pool index values;
apply first unified TCI states, of the one or more unified TCI states, associated with the one or more TCI field codepoints to a signal or a channel associated with a first CORESET pool index value of the one or more CORESET pool index values; and apply second unified TCI states, of the one or more unified TCI states, associated with the one or more TCI field codepoints to a signal or a channel associated with a second CORESET pool index value of the one or more CORESET pool index values.

17. The apparatus of claim 16, wherein a unified TCI state of the one or more unified TCI states, the first unified TCI states, or the second unified TCI states is associated with one or more of a downlink TCI state or an uplink TCI state.

18. The apparatus of claim 16, wherein:
the one or more processors, to receive the one or more MAC-CEs, are configured to receive two MAC-CEs, wherein a first MAC-CE is associated with the first CORESET pool index value and a second MAC-CE is associated with the second CORESET pool index value; and
the one or more processors, to receive the plurality of DCIs, are configured to receive two DCIs, wherein a first DCI associated with a first TCI field codepoint indicates the first CORESET pool index value and a second DCI associated with a second TCI field codepoint indicates the second CORESET pool index value.

19. The apparatus of claim 18, wherein:
the first MAC-CE includes a field that indicates the first CORESET pool index value and the second MAC-CE includes a field that indicates the second CORESET pool index value; and
an interpretation of a TCI field codepoint and an application of an indicated TCI codepoint of the TCI field codepoint is a function of: the first CORESET pool index value of a CORESET in which the first DCI is detected, or the second CORESET pool index value of a CORESET in which the second DCI is detected.

20. The apparatus of claim 16, wherein:
the one or more processors, to receive the one or more MAC-CEs, are configured to receive a single MAC-CE that is not associated with a specific CORESET pool index value; and
the one or more processors, to receive the plurality of DCIs, are configured to receive two DCIs, wherein a first DCI indicates a first TCI field codepoint associated with the first CORESET pool index value and a second DCI indicates a second TCI field codepoint associated with the second CORESET pool index value.

21. The apparatus of claim 20, wherein:
the single MAC-CE does not include a CORESET pool index value; and
an interpretation of a TCI codepoint indicated by a TCI field codepoint is not a function of: the first CORESET pool index value of a CORESET in which the first DCI is detected, or the second CORESET pool index value of a CORESET in which the second DCI is detected.

22. The apparatus of claim 16, wherein:
the one or more processors, to receive the one or more MAC-CEs, are configured to receive a single MAC-CE that is associated with the first CORESET pool index value and the second CORESET pool index value; and
the one or more processors, to receive the plurality of DCIs, are configured to receive a single DCI that indicates a single TCI field codepoint.

23. The apparatus of claim 22, wherein:
the single MAC-CE indicates, for each TCI field codepoint, a joint or downlink or uplink TCI state or a pair of downlink and uplink TCI states to be applied to one or more of the first CORESET pool index value or the second CORESET pool index value; and
an interpretation of the TCI field codepoint and an application of an indicated TCI codepoint of the TCI field codepoint is not a function of a CORESET pool index value of a CORESET in which the single DCI is detected.

24. The apparatus of claim 16, wherein the one or more processors are configured to apply the first unified TCI states and apply the second unified TCI states based at least in part on a UE capability or a radio resource control configuration received from the base station.

25. The apparatus of claim 16, wherein:
the one or more processors are configured to apply the first unified TCI states to the signal or the channel associated with the first CORESET pool index value based at least in part on an association with the first CORESET pool index value; and
the one or more processors are configured to apply the second unified TCI states to the signal or the channel associated with the second CORESET pool index value based at least in part on an association with the second CORESET pool index value,
wherein the signal or the channel associated with the first CORESET pool index value or the signal or the channel associated with the second CORESET pool index value includes one or more of: a physical downlink control channel, channels or signals dynamically scheduled by a DCI different from the plurality of DCIs, a channel state information reference signal, a periodic or semi-persistent physical uplink control channel, a sounding reference signal, a semi-persistent scheduling physical downlink shared channel, a hybrid automatic repeat request acknowledgement, or a configured grant physical uplink shared channel.

26. An apparatus for wireless communication at a base station, comprising:
one or more memories; and
one or more processors, coupled to the one or more memories, configured to:
transmit, to a user equipment (UE), one or more medium access control control elements (MAC-CEs) that indicate a plurality of transmission configuration indication (TCI) field codepoints, wherein each TCI field codepoint corresponds to one or more unified TCI states and one or more control resource set (CORESET) pool index values; and
transmit, to the UE, a plurality of downlink control informations (DCIs), via respective transmission reception points (TRPs), that indicate one or more TCI field codepoints indicated by the one or more MAC-CEs, wherein the one or more TCI field codepoints indicate respective CORESET pool index values.

27. The apparatus of claim 26, wherein:
first unified TCI states, of the one or more unified TCI states, associated with the one or more TCI field codepoints are applied to a signal or a channel associated with a first CORESET pool index value of the one or more CORESET pool index values; and
second unified TCI states, of the one or more unified TCI states, associated with the one or more TCI field codepoints are applied to a signal or a channel associated with a second CORESET pool index value of the one or more CORESET pool index values.

28. The apparatus of claim 26, wherein:
the one or more processors, to transmit the one or more MAC-CEs, are configured to transmit two MAC-CEs, wherein a first MAC-CE is associated with a first CORESET pool index value and a second MAC-CE is associated with a second CORESET pool index value; and the one or more processors, to transmit the plurality of DCIs, are configured to transmit two DCIs, wherein a first DCI associated with a first TCI field codepoint indicates the first CORESET pool index value and a second DCI associated with a second TCI field codepoint indicates the second CORESET pool index value.

29. The apparatus of claim 26, wherein:

the one or more processors, to transmit the one or more MAC-CEs, are configured to transmit a single MAC-CE that is not associated with a specific CORESET pool index value; and the one or more processors, to transmit the plurality of DCIs, are configured to transmit two DCIs, wherein a first DCI indicates a first TCI field codepoint associated with a first CORESET pool index value and a second DCI indicates a second TCI field codepoint associated with a second CORESET pool index value.

30. The apparatus of claim 26, wherein:

the one or more processors, to transmit the one or more MAC-CEs, are configured to transmit a single MAC-CE that is associated with a first CORESET pool index value and a second CORESET pool index value; and the one or more processors, to transmit the plurality of DCIs, are configured to transmit a single DCI that indicates a single TCI field codepoint.

* * * * *